United States Patent
Zorgui et al.

(10) Patent No.: US 12,507,177 B2
(45) Date of Patent: Dec. 23, 2025

(54) TRANSMIT POWER FOR SIDELINK POSITIONING REFERENCE SIGNAL (SL-PRS)

(71) Applicant: QUALCOMM Incorporated, San Diego, CA (US)

(72) Inventors: Marwen Zorgui, San Diego, CA (US); Srinivas Yerramalli, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 399 days.

(21) Appl. No.: 18/156,906

(22) Filed: Jan. 19, 2023

(65) Prior Publication Data

US 2024/0251359 A1 Jul. 25, 2024

(51) Int. Cl.
*H04W 52/32* (2009.01)
*H04W 52/24* (2009.01)

(52) U.S. Cl.
CPC ....... *H04W 52/325* (2013.01); *H04W 52/242* (2013.01)

(58) Field of Classification Search
CPC ............. H04W 52/325; H04W 52/242; H04W 52/0206; H04W 92/18; H04W 52/383
See application file for complete search history.

(56) References Cited

U.S. PATENT DOCUMENTS

| | | | |
|---|---|---|---|
| 11,943,711 B2 * | 3/2024 | Li | H04W 52/0229 |
| 2009/0135753 A1 * | 5/2009 | Veillette | H04L 67/59 |
| | | | 370/311 |
| 2017/0013561 A1 * | 1/2017 | Soldati | H04W 52/0216 |
| 2022/0014872 A1 * | 1/2022 | Balasubramanian | H04W 4/023 |
| 2022/0393820 A1 | 12/2022 | Keating et al. | |
| 2022/0417845 A1 | 12/2022 | Abedini et al. | |
| 2023/0007956 A1 | 1/2023 | Wu et al. | |
| 2023/0008396 A1 | 1/2023 | Wang et al. | |
| 2023/0062805 A1 * | 3/2023 | Baek | H04L 5/0091 |

(Continued)

FOREIGN PATENT DOCUMENTS

WO 2022236196 11/2022

OTHER PUBLICATIONS

Moderator (Intel Corporation): "Discussion Summary #5 for Energy Saving Techniques of NW Energy Saving SI", 3GPP TSG RAN WG1 Meeting #110-bis-e, R1-2210744, 3rd Generation Partnership Project, Mobile Competence Centre, 650, Route Des Lucioles, F-06921 Sophia-Antipolis Cedex, France, vol. Ran WG1, No. e-Meeting, Oct. 10, 2022-Oct. 19, 2022, Oct. 24, 2022, 488 Pages, XP052260207, section 2.1.

(Continued)

*Primary Examiner* — Dominic E Rego
(74) *Attorney, Agent, or Firm* — Thien T. Nguyen

(57) ABSTRACT

Disclosed are techniques for wireless communication. In an aspect, a user equipment (UE) may obtain information indicating one of a plurality of network energy modes for communication between a transmission-reception point (TRP) and the UE. The UE may engage in a sidelink positioning session with at least one other UE, comprising the UE transmitting at least one sidelink positioning reference signal (SL-PRS) symbol for the sidelink positioning session based on a SL-PRS transmit power associated with the one of the plurality of network energy modes.

28 Claims, 14 Drawing Sheets

(56) References Cited

U.S. PATENT DOCUMENTS

| | | | |
|---|---|---|---|
| 2023/0199802 A1* | 6/2023 | Ganesan | H04W 72/25 370/329 |
| 2023/0247548 A1* | 8/2023 | Qiao | H04W 52/0219 370/311 |
| 2024/0147410 A1* | 5/2024 | Hoang | H04W 76/14 |

OTHER PUBLICATIONS

Moderator (Qualcomm): "Moderator Summary #4 on Potential Solutions for SI Positioning", 3GPP TSG RAN WG1 #111, R1-2212938, Type Discussion, FS_NR POS_ENH2, 3rd Generation Partnership Project, Mobile Competence Centre, 650, Route Des Lucioles, F-06921 Sophia-Antipolis Cedex, France, vol. 3GPP RAN 1, No. Toulouse, FR, Nov. 14, 2022-Nov. 18, 2022, Nov. 21, 2022, 82 Pages, XP052223475, Section 6.1.
Partial International Search Report—PCT/US2023/080719—ISA/EPO—Mar. 12, 2024.
International Search Report and Written Opinion—PCT/US2023/080719—ISA/EPO—Jun. 17, 2024.

* cited by examiner

TRANSMIT POWER FOR SIDELINK POSITIONING REFERENCE SIGNAL (SL-PRS)

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)) and other technical enhancements.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a user equipment (UE) includes obtaining information indicating one of a plurality of network energy modes for communication between a transmission-reception point (TRP) and the UE; and engaging in a sidelink positioning session with at least one other UE, comprising: transmitting at least one sidelink positioning reference signal (SL-PRS) symbol for the sidelink positioning session based on a SL-PRS transmit power associated with the one of the plurality of network energy modes.

In an aspect, a method of operating a user equipment (UE) includes receiving information from a transmission-reception point (TRP) indicating a network energy mode for communication between the TRP and the UE; communicating with the TRP over a first portion of a system bandwidth; and transmitting or receiving a sidelink positioning reference signal (SL-PRS) over a second portion of the system bandwidth different from the first portion of the system bandwidth, wherein the first portion of the system bandwidth and the second portion of the system bandwidth are identifiable based on the network energy mode.

In an aspect, a method of operating a user equipment (UE) includes communicating with a transmission-reception point (TRP) over first one or more slots based on one or more network energy saving modes, the first one or more slots have no sidelink positioning reference signal (SL-PRS) resource allocated therein, and the one or more network energy saving modes corresponding to applying one or more power saving modifications to a baseline network energy mode; and communicating with the TRP over second one or more slots based on the baseline network energy mode, the second one or more slots have at least one SL-PRS resource allocated therein.

In an aspect, a user equipment (UE) includes a memory; at least one transceiver; and at least one processor communicatively coupled to the memory and the at least one transceiver, the at least one processor configured to: obtain information indicating one of a plurality of network energy modes for communication between a transmission-reception point (TRP) and the UE; and engage in a sidelink positioning session with at least one other UE, wherein the at least one processor is configured to: transmit, via the at least one transceiver, at least one sidelink positioning reference signal (SL-PRS) symbol for the sidelink positioning session based on a SL-PRS transmit power associated with the one of the plurality of network energy modes.

In an aspect, a user equipment (UE) includes a memory; at least one transceiver; and at least one processor communicatively coupled to the memory and the at least one transceiver, the at least one processor configured to: receive, via the at least one transceiver, information from a transmission-reception point (TRP) indicating a network energy mode for communication between the TRP and the UE; communicate, via the at least one transceiver, with the TRP over a first portion of a system bandwidth; and transmit or receive, via the at least one transceiver, a sidelink positioning reference signal (SL-PRS) over a second portion of the system bandwidth different from the first portion of the system bandwidth, wherein the first portion of the system bandwidth and the second portion of the system bandwidth are identifiable based on the network energy mode.

In an aspect, a user equipment (UE) includes a memory; at least one transceiver; and at least one processor communicatively coupled to the memory and the at least one transceiver, the at least one processor configured to: communicate, via the at least one transceiver, with a transmission-reception point (TRP) over first one or more slots based on one or more network energy saving modes, the first one or more slots have no sidelink positioning reference signal (SL-PRS) resource allocated therein, and the one or more network energy saving modes corresponding to applying one or more power saving modifications to a baseline network energy mode; and communicate, via the at least one transceiver, with the TRP over second one or more slots based on the baseline network energy mode, the second one or more slots have at least one SL-PRS resource allocated therein.

In an aspect, a user equipment (UE) includes means for obtaining information indicating one of a plurality of network energy modes for communication between a transmission-reception point (TRP) and the UE; and means for engaging in a sidelink positioning session with at least one other UE, comprising: means for transmitting at least one sidelink positioning reference signal (SL-PRS) symbol for the sidelink positioning session based on a SL-PRS transmit power associated with the one of the plurality of network energy modes.

In an aspect, a user equipment (UE) includes means for receiving information from a transmission-reception point (TRP) indicating a network energy mode for communication between the TRP and the UE; means for communicating with the TRP over a first portion of a system bandwidth; and means for transmitting or receiving a sidelink positioning reference signal (SL-PRS) over a second portion of the system bandwidth different from the first portion of the system bandwidth, wherein the first portion of the system bandwidth and the second portion of the system bandwidth are identifiable based on the network energy mode.

In an aspect, a user equipment (UE) includes means for communicating with a transmission-reception point (TRP) over first one or more slots based on one or more network energy saving modes, the first one or more slots have no sidelink positioning reference signal (SL-PRS) resource allocated therein, and the one or more network energy saving modes corresponding to applying one or more power saving modifications to a baseline network energy mode; and means for communicating with the TRP over second one or more slots based on the baseline network energy mode, the second one or more slots have at least one SL-PRS resource allocated therein.

In an aspect, a non-transitory computer-readable medium stores computer-executable instructions that, when executed by a user equipment (UE), cause the UE to: obtain information indicating one of a plurality of network energy modes for communication between a transmission-reception point (TRP) and the UE; and engage in a sidelink positioning session with at least one other UE, wherein the instructions further cause the UE to: transmit at least one sidelink positioning reference signal (SL-PRS) symbol for the sidelink positioning session based on a SL-PRS transmit power associated with the one of the plurality of network energy modes.

In an aspect, a non-transitory computer-readable medium stores computer-executable instructions that, when executed by a user equipment (UE), cause the UE to: receive information from a transmission-reception point (TRP) indicating a network energy mode for communication between the TRP and the UE; communicate with the TRP over a first portion of a system bandwidth; and transmit or receive a sidelink positioning reference signal (SL-PRS) over a second portion of the system bandwidth different from the first portion of the system bandwidth, wherein the first portion of the system bandwidth and the second portion of the system bandwidth are identifiable based on the network energy mode.

In an aspect, a non-transitory computer-readable medium stores computer-executable instructions that, when executed by a user equipment (UE), cause the UE to: communicate with a transmission-reception point (TRP) over first one or more slots based on one or more network energy saving modes, the first one or more slots have no sidelink positioning reference signal (SL-PRS) resource allocated therein, and the one or more network energy saving modes corresponding to applying one or more power saving modifications to a baseline network energy mode; and communicate with the TRP over second one or more slots based on the baseline network energy mode, the second one or more slots have at least one SL-PRS resource allocated therein.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
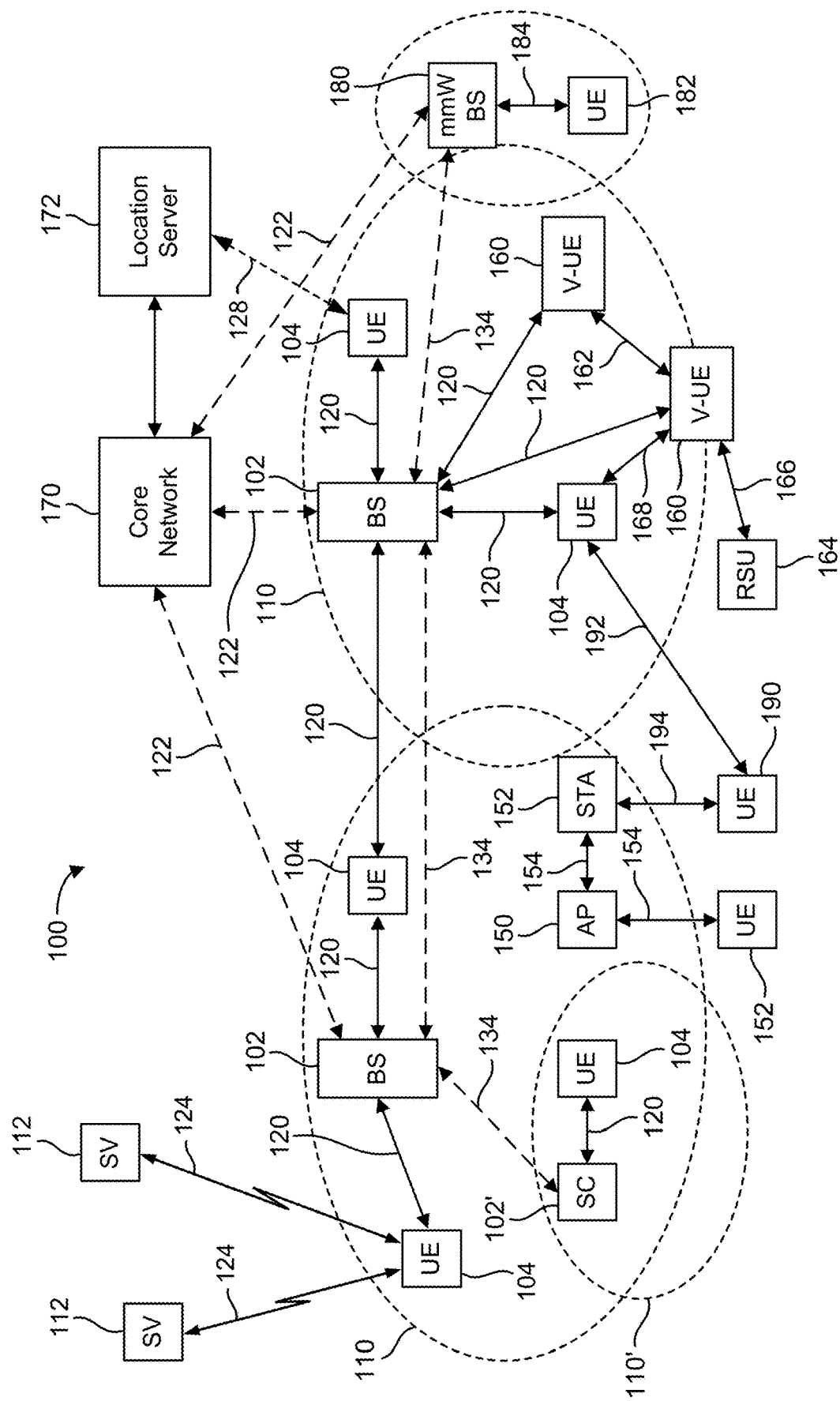
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, an in-vehicle infotainment system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3

GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 using the Uu interface (i.e., the air interface between a UE and a base station). V-UEs 160 may also communicate directly with each other over a wireless sidelink 162, with a roadside unit (RSU) 164 (a roadside access point) over a wireless sidelink 166, or with sidelink-capable UEs 104 over a wireless sidelink 168 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS G5A band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more RSUs 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more RSUs 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards RSUs 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
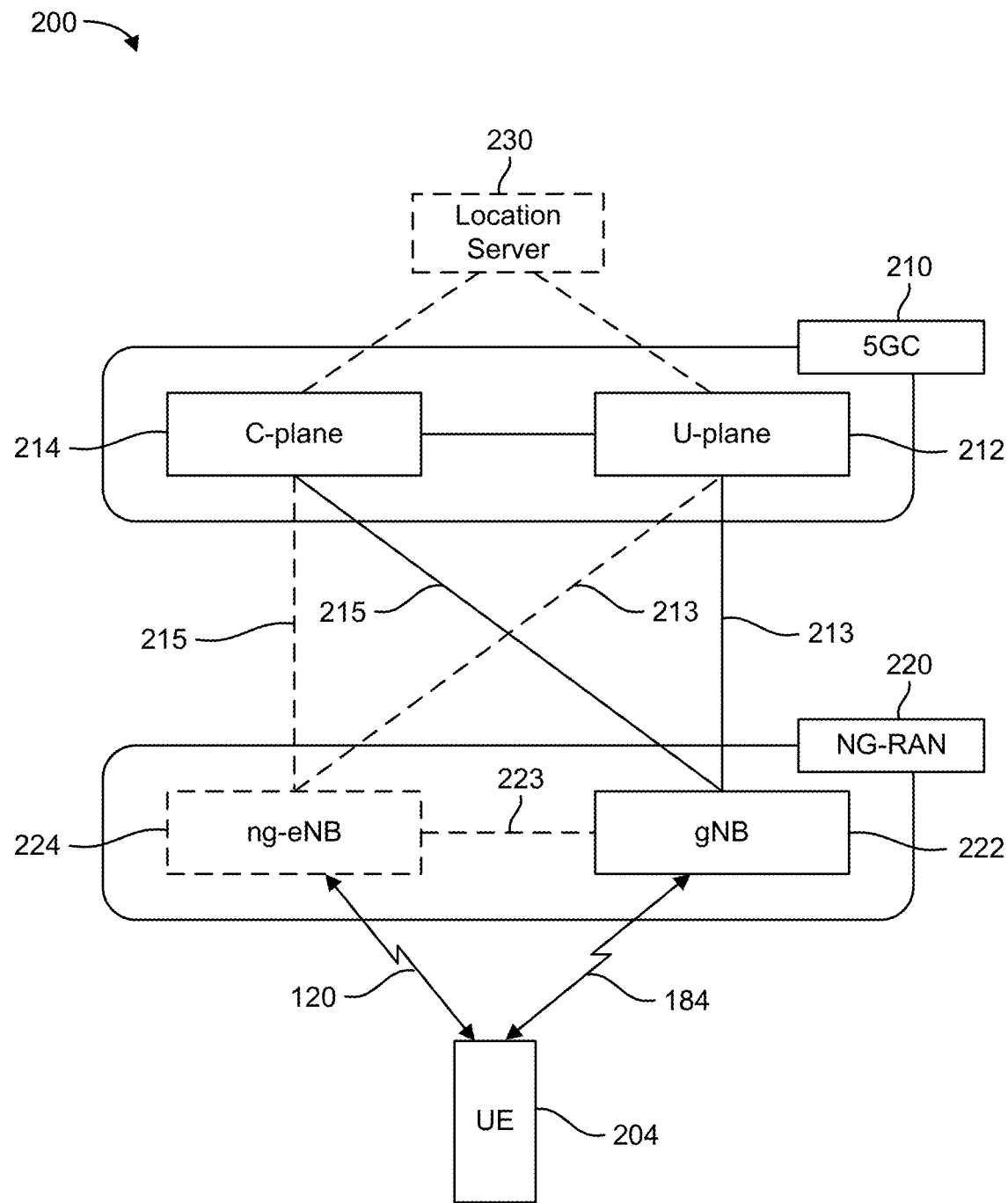
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
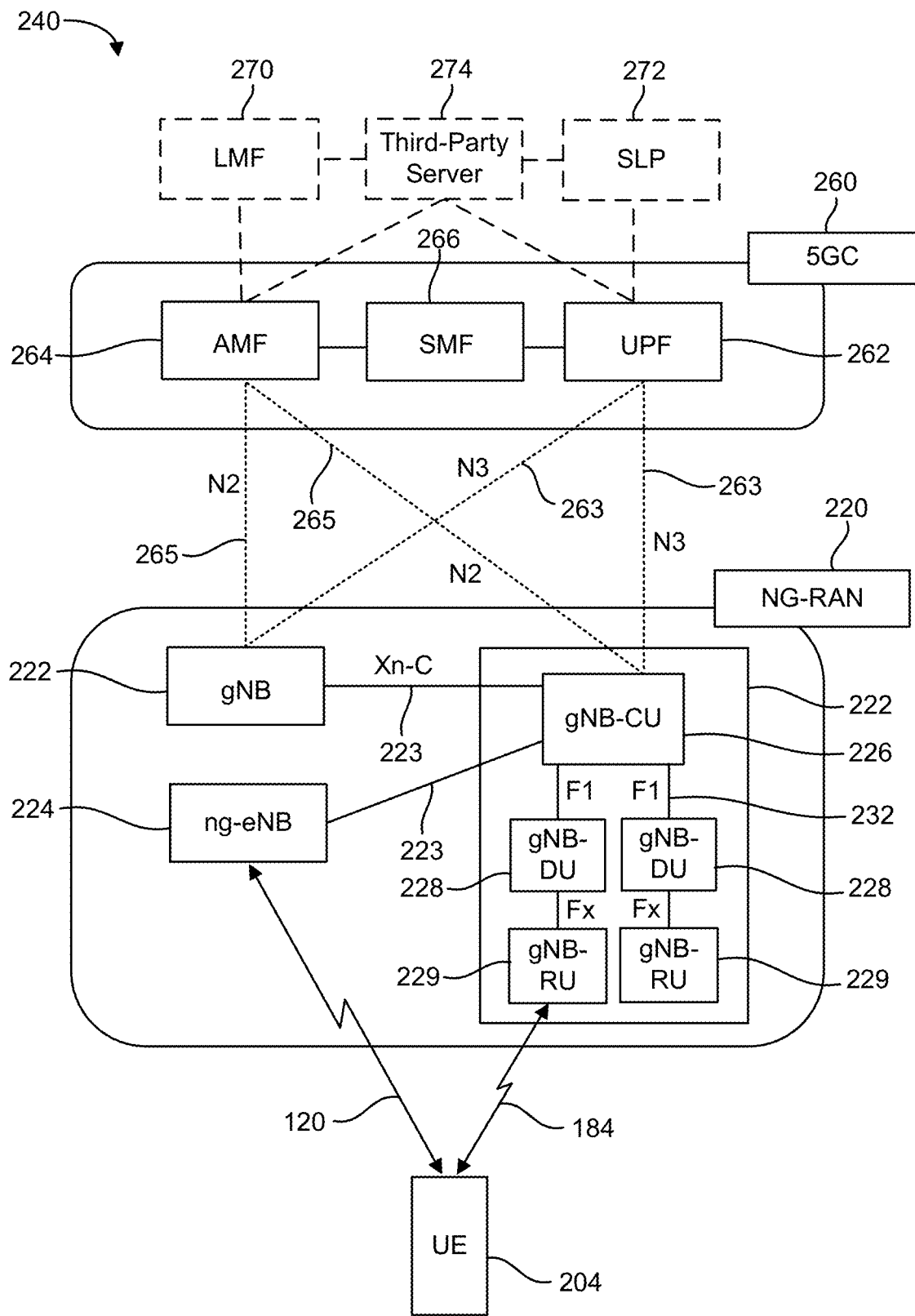

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
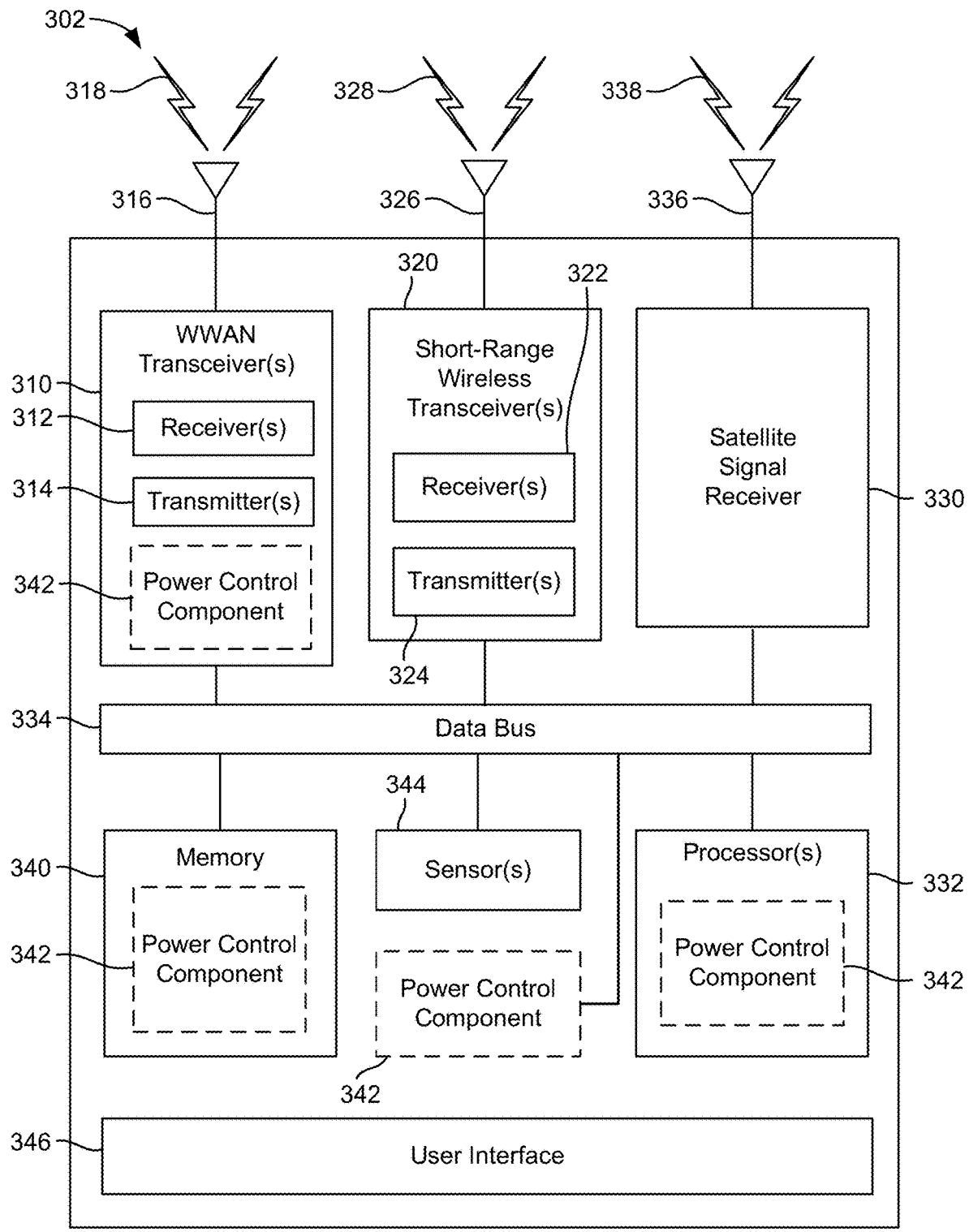
FIGS. 3A, 3B, and 3C are simplified block diagrams of several sample aspects of components that may be employed in a user equipment (UE), a base station, and a network entity, respectively, and configured to support communications as taught herein.
Figure 3B:
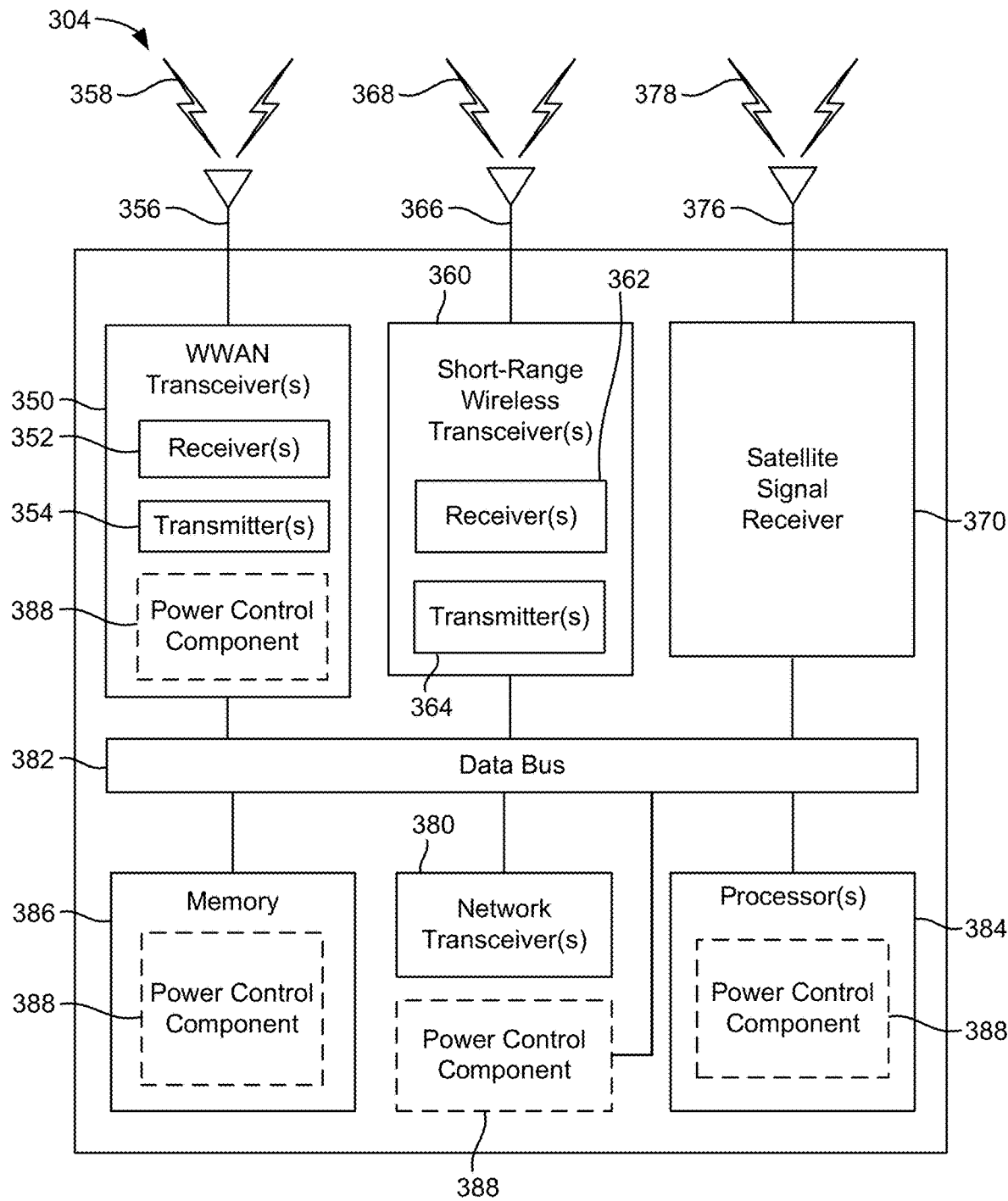
Figure 3C:
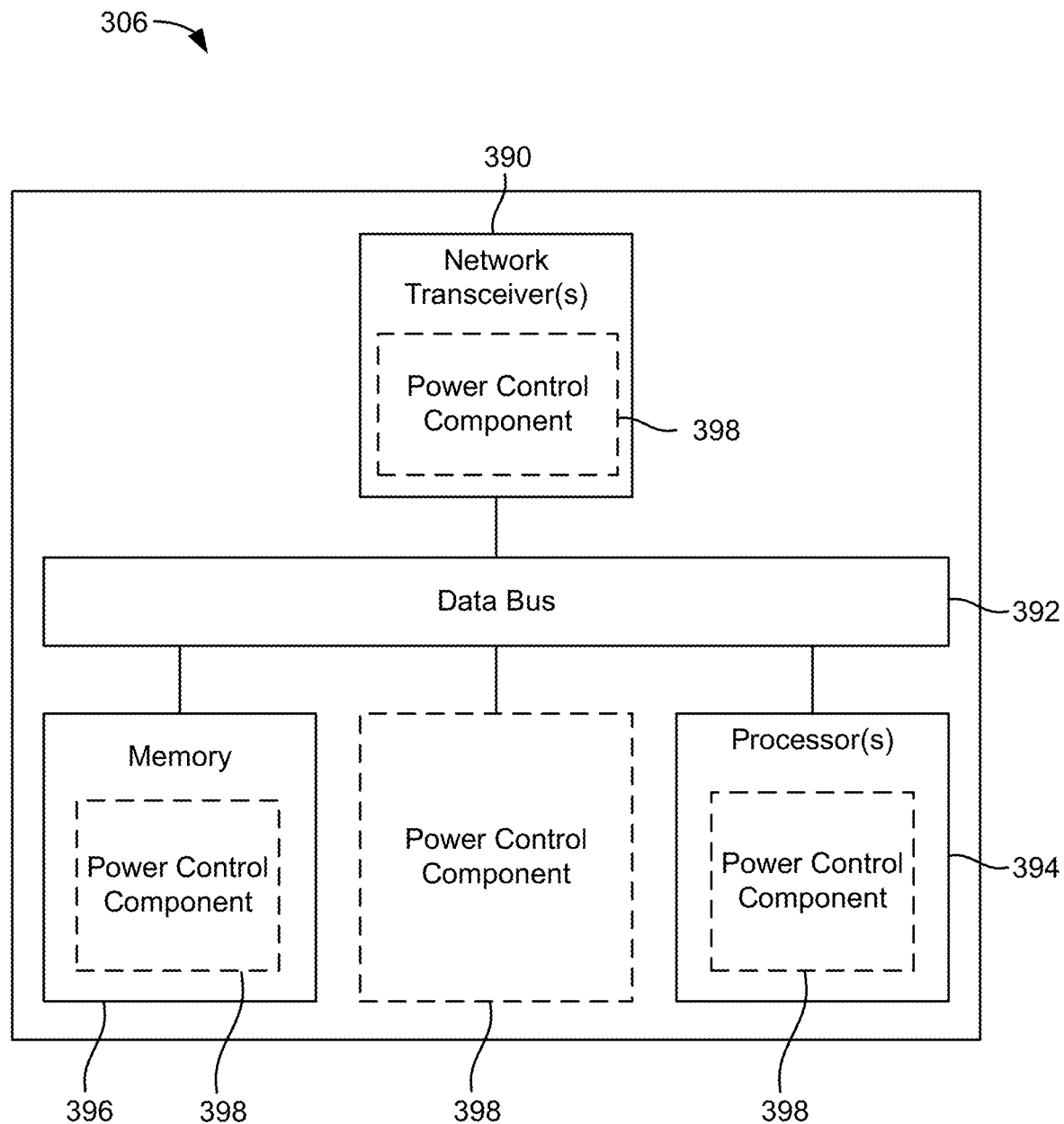

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), ultra-wideband (UWB), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, UWB transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include power control component 342, 388, and 398, respectively. The power control component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the power control component 342, 388, and 398 may be external to the processors 332, 384, and 394 (e.g., part of a modem processing system, integrated with another processing system, etc.). Alternatively, the power control component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the power control component 342, which may be, for example, part of the one or more WWAN transceivers 310, the memory 340, the one or more processors 332, or any combination thereof, or may be a standalone component. FIG. 3B illustrates possible locations of the power control component 388, which may be, for example, part of the one or more WWAN transceivers 350, the memory 386, the one or more processors 384, or any combination thereof, or may be a standalone component. FIG. 3C illustrates possible locations of the power control component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such as a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the downlink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite signal receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the power control component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4A:
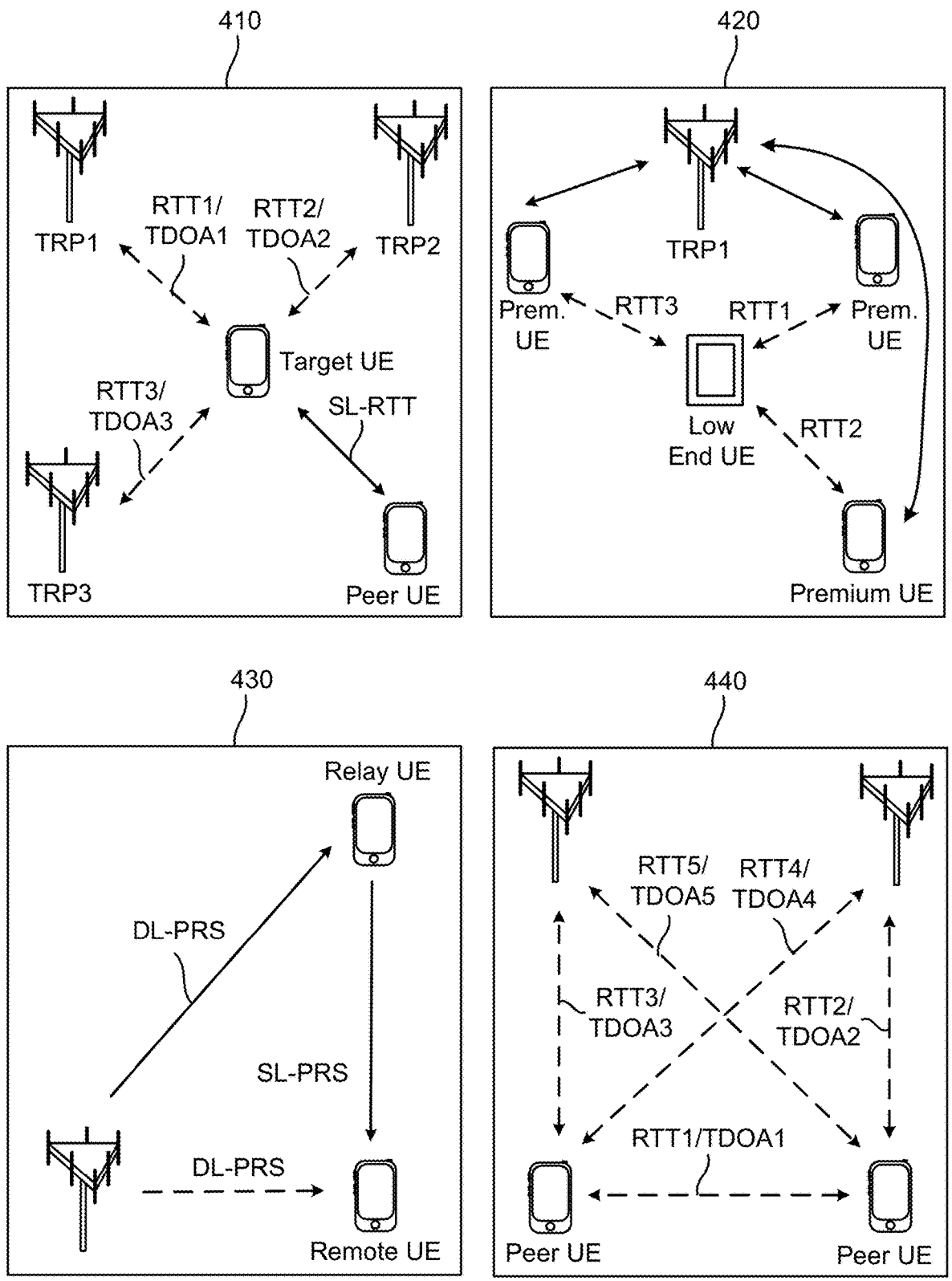
FIGS. 4A and 4B illustrate various scenarios of interest for sidelink-only or joint Uu and sidelink positioning, according to aspects of the disclosure.

NR supports, or enables, various sidelink positioning techniques. FIG. 4A illustrates various scenarios of interest for sidelink-only or joint Uu and sidelink positioning, according to aspects of the disclosure. In scenario 410, at least one peer UE with a known location can improve the Uu-based positioning (e.g., multi-cell round-trip-time (RTT), downlink time difference of arrival (DL-TDOA), etc.) of a target UE by providing an additional anchor (e.g., using sidelink RTT (SL-RTT)). In scenario 420, a low-end (e.g., reduced capacity, or "RedCap") target UE may obtain the assistance of premium UEs to determine its location using, e.g., sidelink positioning and ranging procedures with the premium UEs. Compared to the low-end UE, the premium UEs may have more capabilities, such as more sensors, a faster processor, more memory, more antenna elements, higher transmit power capability, access to additional frequency bands, or any combination thereof. In scenario 430, a relay UE (e.g., with a known location) participates in the positioning estimation of a remote UE without performing uplink positioning reference signal (PRS) transmission over the Uu interface. Scenario 440 illustrates the joint positioning of multiple UEs. Specifically, in scenario 440, two UEs with unknown positions can be jointly located in non-line-of-sight (NLOS) conditions by utilizing constraints from nearby UEs.

Figure 4B:
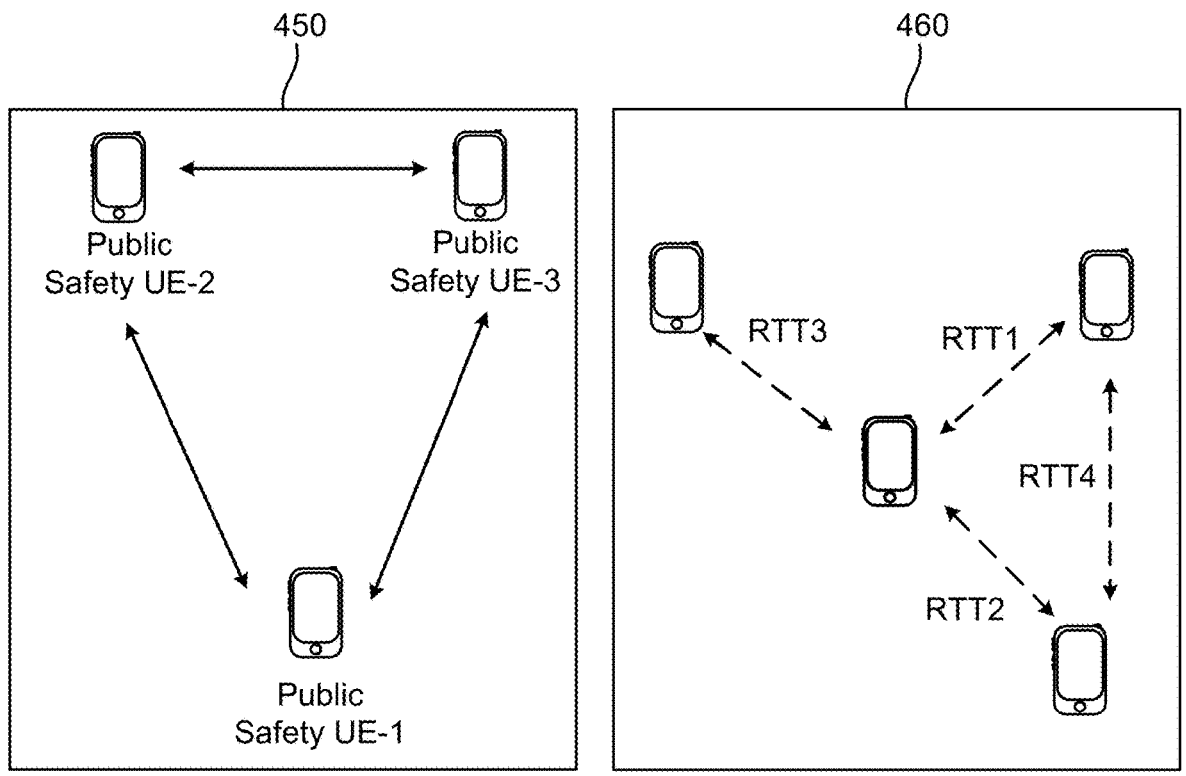

FIG. 4B illustrates additional scenarios of interest for sidelink-only or joint Uu and sidelink positioning, according to aspects of the disclosure. In scenario 450, UEs used for public safety (e.g., by police, firefighters, and/or the like) may perform peer-to-peer (P2P) positioning and ranging for public safety and other uses. For example, in scenario 450, the public safety UEs may be out of coverage of a network and determine a location or a relative distance and a relative position among the public safety UEs using sidelink positioning techniques. Similarly, scenario 460 shows multiple UEs that are out of coverage and determine a location or a relative distance and a relative position using sidelink positioning techniques, such as SL-RTT.

Figure 5:
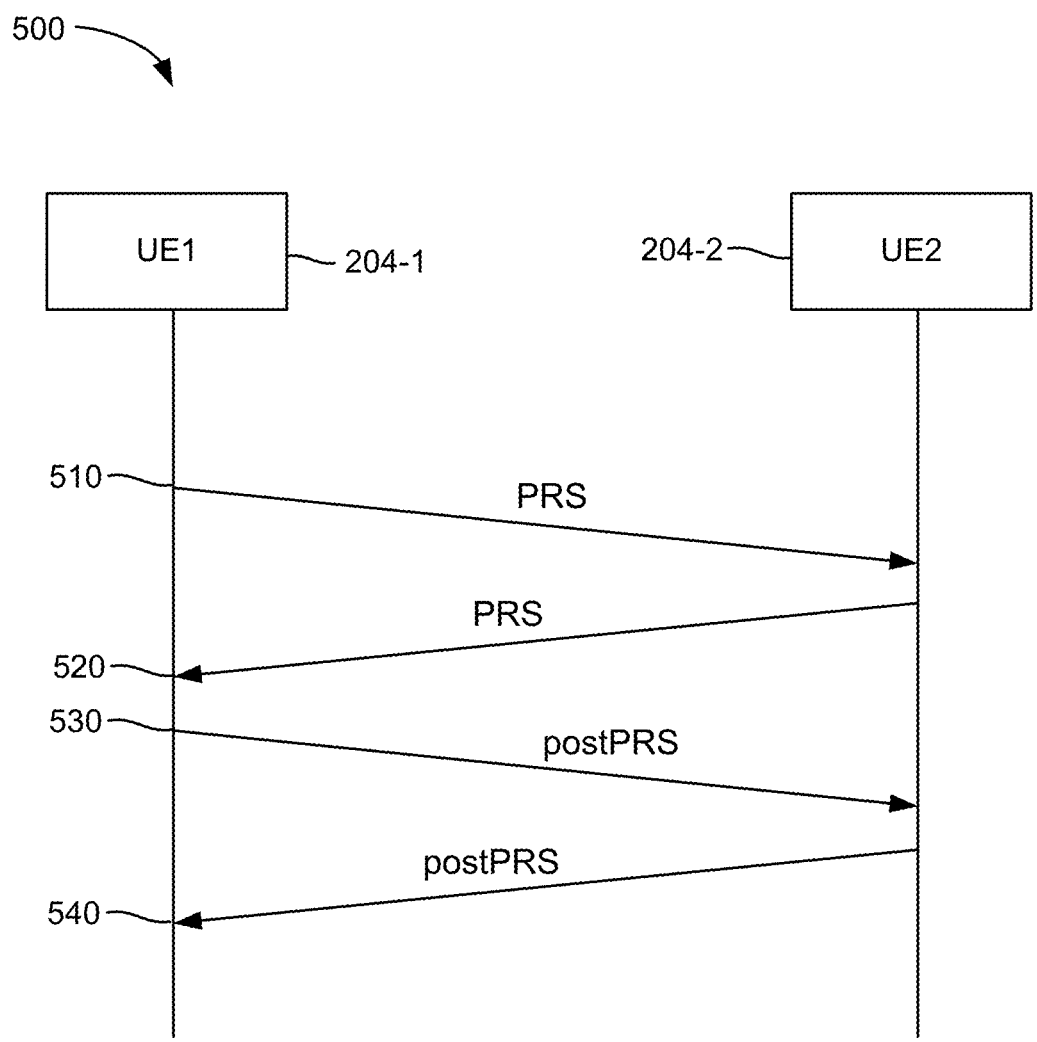
FIG. 5 illustrates an example sidelink ranging and positioning procedure, according to aspects of the disclosure.

FIG. 5 illustrates an example sidelink ranging and positioning procedure 500, according to aspects of the disclosure. The sidelink ranging and positioning procedure 500 may also be referred to as a sidelink RTT positioning procedure. Sidelink ranging is based on calculating an inter-UE RTT measurement, as determined from the transmit and receive times of PRS (e.g., SL-PRS). Each UE reports an RTT measurement to all other participating UEs, along with its location (if known). For UEs having zero or inaccurate knowledge of their location, the RTT procedure may yield an inter-UE range between the involved UEs. For UEs having accurate knowledge of their location, the range may yield an absolute location.

As shown in FIG. 5, after initial signaling between UE1 204-1 and UE2 204-2 to engage in a sidelink positioning session, at stages 510 and 520, UEs 204-1 and 204-2 transmit PRS (e.g., SL-PRS) to each other. The resources on which the PRS are transmitted may be configured/allocated by the network (e.g., one of the UE's serving base station) or negotiated by the UEs 204-1 and 204-2. The UE1 204-1 measures the transmission-to-reception (Tx–Rx) time difference between the transmission time of PRS at stage 510 and the reception time of PRS at stage 520. The UE2 204-2 measures the reception-to-transmission (Rx–Tx) time difference between the reception time of PRS at stage 510 and the transmission time of PRS at stage 520. Note that although FIG. 5 illustrates the UE1 204-1 transmitting PRS first, the UE2 204-2 may instead transmit PRS first.

At stages 530 and 540, the UEs 204-1 and 204-2 exchange their respective time difference measurements in post PRS messages (labeled "postPRS"). If the UE1 204-1 has not yet provided its location to the UE2 204-2, it does so at this point. Each one of the UEs 204-1 and 204-2 is then able to determine the RTT between the UEs 204-1 and 204-2 based on the Tx–Rx and Rx–Tx time difference measurements (specifically, the difference between the Tx–Rx and Rx–Tx time difference measurements). Based on the RTT measurement and the speed of light, UE 204-1 or 204-2 can then estimate the distance (or range) between the two UEs 204-1 and 204-2 (specifically, half the RTT measurement multiplied by the speed of light). In at least one aspect, the UE2 204-2 has the absolute location (e.g., geographic coordinates) of the UE1 204-1, the UE2 204-2 can use that location and the distance to the UE1 204-1 to determine its own absolute location.

Note that while FIG. 5 illustrates two UEs 204-1 and 204-2, a UE may perform, or attempt to perform, the sidelink ranging and positioning procedure 500 with multiple UEs.

In one aspect, the PRS for the sidelink positioning session or the SL-PRS can have a waveform the same as that of UL-PRS or DL-PRS defined in LTE or NR for positioning, or a waveform that is different from that of UL-PRS or DL-PRS.

Sidelink communication takes place in transmission or reception resource pools. In the frequency domain, the minimum resource allocation unit is a sub-channel (e.g., a collection of consecutive PRBs in the frequency domain). In the time domain, resource allocation is in one slot intervals. However, some slots are not available for sidelink, and some slots contain feedback resources. In addition, sidelink resources can be (pre)configured to occupy fewer than the 14 symbols of a slot.

Sidelink resources are configured at the radio resource control (RRC) layer. The RRC configuration can be by pre-configuration (e.g., preloaded on the UE) or configuration (e.g., from a serving base station).

In some aspects, the positioning procedures based on sidelink signals may be further expanded or improved. The studies for expanding or improving the sidelink (SL) positioning procedures may include a scenario regarding PC5-only-based positioning and another scenario regarding a combination of Uu-based positioning and PC5-based positioning.

In some aspects, the sidelink positioning procedures may be expanded or improved in view of various positioning accuracy requirements configured for various NR or V2X use cases. In one example, a V2X use case may consider a first set of positioning accuracy requirement that includes the horizontal accuracy of 1.5 meters (absolute and/or relative) and the vertical accuracy of 3 meters (absolute and/or relative) for 90% of UEs. In another example, a V2X use case may consider a second set of positioning accuracy requirement that includes the horizontal accuracy of 0.5 meters (absolute and/or relative) and the vertical accuracy of 2 meters (absolute and/or relative) for 90% of UEs.

In some aspects, a report for an evaluated SL positioning procedure may indicate (1) whether each of the first set of positioning accuracy requirements and the second set of positioning accuracy requirements may be satisfied, and/or (2) a percentage of UEs that may satisfy a target set of positioning accuracy requirements in a case that less than 90% of UEs may satisfy the target set of positioning accuracy requirements. In some aspects, a target set of positioning accuracy requirements may not necessarily be reached under all scenarios and deployments for an evaluated SL positioning procedure. In some aspects, not all SL positioning procedures may achieve all positioning accuracy requirements in all scenarios.

In some aspects, a TRP may communicate with one or more UEs (also referred to as UE-TRP transmissions in this disclosure) based on one of a plurality of network energy modes, which may include a baseline network energy mode and one or more network energy saving (NES) modes. In some aspects, the one or more network energy saving modes may correspond to applying one or more power saving modifications to the baseline network energy mode. In some aspects, the TRP may adopt one of the one or more network energy saving modes to save power and reduce the RF footprint of the TRP while maintaining the quality of the network operations. In some aspects, the TRP may switch between different network energy modes based on a network activity or configuration. In some aspects, the baseline network energy mode may correspond to a network energy mode that is compatible with existing communication standards, and thus may also be referred to as a legacy energy mode.

Figure 6:
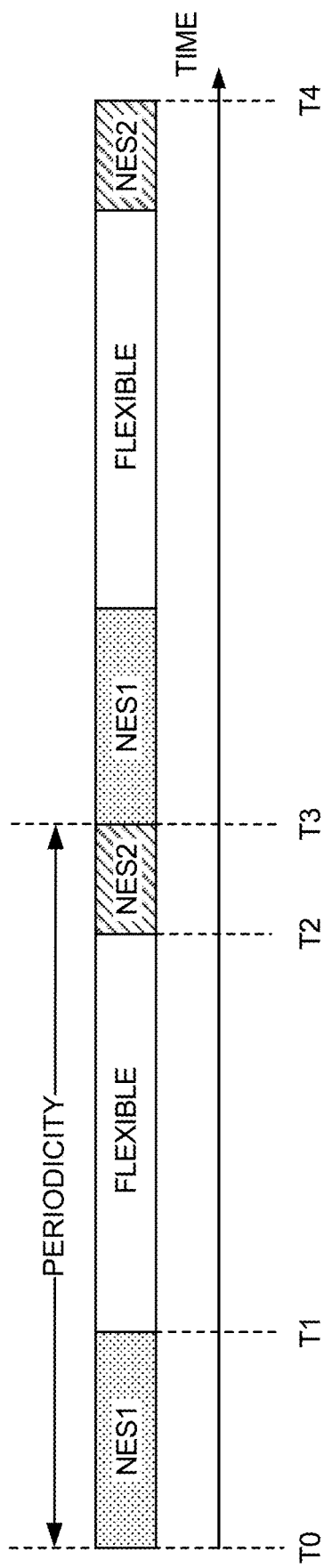
FIG. 6 is a diagram illustrating an example network energy mode configuration, according to aspects of the disclosure.

FIG. 6 is a diagram illustrating an example network energy mode configuration, according to aspects of the disclosure. In some aspects, the one or more NES modes may be configured dynamically and/or semi-statically to achieve a more efficient operation and a finer granularity adaptation of transmissions and/or receptions in one or more of network energy saving techniques in time, frequency, spatial, and/or power domains. As shown in FIG. 6, a network energy mode configuration may specify a pattern of designated network energy modes in the time domain. The pattern may include a first portion (e.g., corresponding to a time duration from time T0 to time T1) where the TRP may adopt a first NES mode (labeled "NES1" in FIG. 6), a second portion (e.g., corresponding to a time duration from time T1 to time T2) where the network energy mode may be flexible or and dynamically adjustable (labeled "FLEXIBLE" in FIG. 6), and a third portion (e.g., corresponding to a time duration from time T2 to time T3) where the TRP may adopt a second NES mode (labeled "NES2" in FIG. 6). The network energy mode configuration may further include a periodicity (e.g., corresponding to a time duration from time T0 to time T3) indicating a repeating duration, where the pattern may repeat in the time domain based on the periodicity (e.g., the pattern from time T0 to time T3 may be repeated in the time duration from time T3 to time T4).

Figure 7:
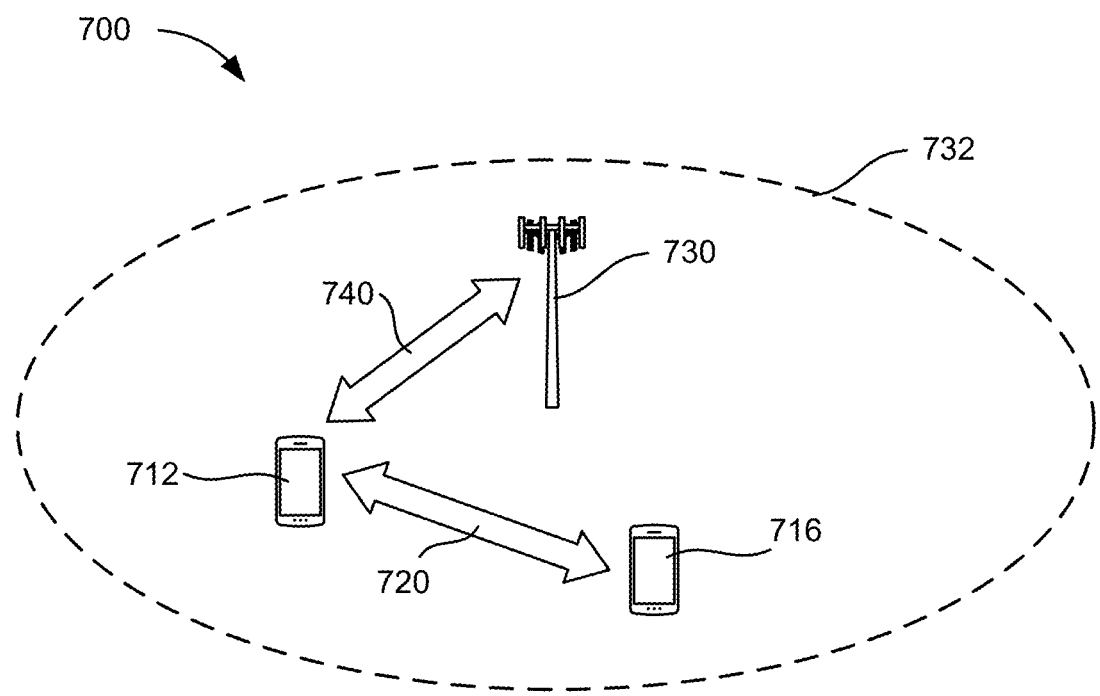
FIG. 7 illustrates a system that includes two UEs engaging in a sidelink positioning session and a TRP that serves at least one of the UEs, according to aspects of the disclosure.

FIG. 7 illustrates a system 700 that includes two UEs 712 and 716 engaging in a SL positioning session (as indicated by the arrows 720) and a TRP 730 that serves at least the UE 712, according to aspects of the disclosure. In some aspects, the TRP 730 may have a coverage area 732, within which a UE may communication with the TRP 730. For example, the UE 712 may be within the coverage area 732 and may communicate with the TRP 730 (as indicated by the arrows 740). In some aspects, the UEs 712 and 716 may correspond to any UE described in this disclosure. In some aspects, the TRP 730 may correspond to a TRP, a base station, or a RAN described in this disclosure.

In some aspects, at a given moment, the TRP 730 may adopt one of a plurality of network energy modes. In some aspects, the plurality of network energy modes may include a baseline network energy mode and one or more NES modes. In some aspects, the one or more NES modes may modify the baseline network energy mode based on adjusting the bandwidth configuration, the time domain configuration, the antenna configuration, the beamforming configuration, the power level configuration, or any combination thereof. For example, under certain NES modes, the TRP 730 may reduce the number of antennas or change the transmit power. In some aspects, the network energy mode that is adopted by the TRP 730 may be signaled to the UE 712, such that the UE 712 may apply the proper configurations and may exhibit the proper behaviors consistent with the network energy mode of the TRP 730.

In some aspects, the interference (e.g., the interference from SL transmissions between the UEs 712 and 716) the network (e.g., the TRP 730) may be able to tolerate may vary under different NES modes. For example, in a case the TRP 730 has more active antennas and thus a higher processing gain, the TRP 730 may be capable of withstanding a higher level of interference while performing the UE-TRP transmissions. In some examples, the TRP 730 may adopt a network energy mode that is configured to lower the signal power levels of the transmissions between the TRP 730 and the UE (e.g., the UE 712) and the TRP may tend to have a reduced capability of withstanding the interference caused by the SL transmissions while performing the UE-TRP transmissions.

In some aspects, a SL-PRS transmit power used by a UE (e.g., the UE 712 or the UE 716) to transmit one or more SL-PRS symbols may be configurable or adjustable. In some aspects, the SL-PRS transmit power may be a maximum permitted transmit power level (e.g., also referred to as the full power) determined based on the UE power class and/or the regulatory requirements. In some aspects, the SL-PRS transmit power may be determined based on a pre-configured value, a downlink pathloss between the TRP (or a base station) and the UE, a sidelink pathloss between at least one other UE and the UE, both the downlink pathloss and the sidelink pathloss, or any combination thereof. In some aspects, some of these factors, such as the downlink pathloss, may provide an indication of the interference tolerance capability for the UE-TRP transmissions. In some aspects, the SL-PRS transmit power may be determined further based on identifying the network energy mode adopted by the TRP. In some aspects, different power control strategies may be associated with different network energy modes, and may be selectively used for determining the SL-PRS transmit power based on the network energy mode adopted by the TRP. In some aspects, the power control strategy for an NES mode may correspond to a modified version of a power control strategy for the baseline network energy mode.

In some aspects, a UE (e.g., the UE 712) may obtain information indicating one of a plurality of network energy modes for communication between a TRP (e.g., the TRP 730) and the UE. The UE may engage in an SL positioning session (e.g., the SL positioning session 720) with at least one other UE (e.g., the UE 716), including transmitting at least one SL-PRS symbol for the SL positioning session based on a SL-PRS transmit power associated with the one of the plurality of network energy modes. In some aspects, the SL-PRS transmit power may be determined based on a corresponding power control strategy associated with the one of the plurality of network energy modes.

In some aspects, the power control strategy may correspond to setting the SL-PRS transmit power based on applying an offset value to a baseline value. In some aspects, the UE may obtain the offset value associated with the one of the network energy modes, obtain the baseline value, and apply the corresponding offset value to the baseline value.

In some aspects, according to a first example, the power control strategy may also be referred to as a constant value strategy, as the baseline value and the offset values associated with various network energy modes may be configured or pre-configured and remain fixed until being updated by the system (e.g., in a static or semi-static manner, by the TRP 730, a base station, or a location server). In some aspects, the SL-PRS transmit power ($P_{SL-PRS}$) may be set as a summation of the baseline value ($P_0$) and the corresponding offset value ($Offset_{NES}$), based on the expression of $P_{SL-PRS}=P_0+Offset_{NES}$.

For example, an offset value ($Offset_{NES}$) may be −5 dB for a first NES mode and may be −10 dB for a second NES mode. In this example, when the TRP 730 adopts the first NES mode, the UE 712 may set the SL-PRS transmit power ($P_{SL-PRS}$) to $P_0$−5 dB; and when the TRP 730 adopts the second NES mode, the UE 712 may set the SL-PRS transmit power ($P_{SL-PRS}$) to $P_0$−10 dB.

In some aspects, the baseline value may be based on a pre-defined, fixed value, a configured value from the TRP, a base station, or a location server (e.g., corresponding to the LMF 270), a power class of the UE, a regulatory power requirement for a frequency range for the at least one SL-PRS symbol (for the SL positioning session), or a combination thereof.

In some aspects, the offset values may be zero, positive, or negative. In some aspects, in a case that an offset value or an offset indication from which the offset value may be derivable is not signaled, the UE may assume that the offset value is zero. In some aspects, the UE may identify the offset value in a lookup table specifying candidate offset values in association with at least a subset of the network energy modes. In some aspects, the lookup table may be prestored in the UE according to a communication standard, or may be configured by the TRP, the base station, or the location server. In some aspects, the UE may receive the offset value via signaling from the TRP, the base station, or the location server. In some aspects, the offset value may be included in a broadcasted positioning SIB, a MAC control element (MAC-CE) or downlink control information (DCI) message that also includes the information indicating the one of the network energy modes, one or more RRC messages, or one or more LTE positioning protocol (LPP) messages from the location server.

In some aspects, the power control strategy may correspond to setting the SL-PRS transmit power based on applying an offset value to a baseline value, where the baseline value may be based on an Energy per Resource Element (EPRE) of a Sidelink Channel State Information Reference Signal (SL-CSI-RS), a Physical Sidelink Control Channel (PSCCH) DMRS, or a Physical Sidelink Shared Channel (PSSCH) DRMS transmitted by the UE. In some aspects, the UE may obtain the offset value associated with the one of the network energy modes, obtain the baseline value, and apply the corresponding offset value to the baseline value. In some aspects, the UE may obtain the offset value as discussed above. In some aspects, the SL-PRS transmit power may be defined in EPRE ($P_{SL-PRS}$-EPRE) and may be set as a summation of the baseline value in EPRE ($P_0$-EPRE) and the corresponding offset value ($Offset_{NES}$), based on the expression of $P_{SL-PRS}$-EPRE=$P_0$-EPRE+$Offset_{NES}$.

In some aspects, the power control strategy may correspond to setting the SL-PRS transmit power based on obtaining a path-loss value for the UE (e.g., based on DL path loss, SL path loss, or a combination of DL path loss and SL path loss), obtaining a path-loss coefficient or a path-loss offset value associated with the one of the network energy modes, obtaining a reference power calculated based on the path-loss value and based on the path-loss coefficient or the path-loss offset value, and setting the SL-PRS transmit power based on the reference power.

In some aspects, the reference power may be calculated based on an equation of $P_{REF}=P_t+\alpha_{NES} \times PL$, $P_{REF}$ representing the reference power, $P_t$ representing a target received power at the at least one other UE (e.g., the UE 716), $\alpha_{NES}$ representing the path-loss coefficient associated with the one of the network energy modes, and PL representing the path-loss value for the UE (e.g., the UE 712). In some aspects, the SL-PRS transmit power may be set based on a smaller one of a maximum permitted transmission power for the UE and the calculated reference power.

In some aspects, the reference power may be calculated based on an equation of $P_{REF}=P_t+\alpha \times PL+GN_{NES}$, $P_{REF}$ representing the reference power, $P_t$ representing a target received power at the at least one other UE (e.g., the UE 716), $\alpha$ representing a path-loss coefficient that is not associated with the one of the network energy modes, PL representing the path-loss value for the UE (e.g., the UE 712), and $GN_{NES}$ representing the path-loss offset value associated with the one of the network energy modes. In some aspects, the SL-PRS transmit power may be set based on a smaller one of a maximum permitted transmission power for the UE and the calculated reference power.

In some aspects, the path-loss coefficient (e.g., $\alpha_{NES}$) or the path-loss offset value (e.g., $GN_{NES}$) may be prestored in the UE (e.g., UE 712) according to a communication standard, configured by the TRP, the base station, or the location server, included in one or more RRC messages, included in a broadcasted positioning SIB, included in a MAC-CE or DCI message that also includes the information indicating the one of network energy modes, or included in one or more LPP messages from the location server.

In some aspects, in a case that a UE may be configured to transmit multiple SL-PRS symbols of a SL-PRS resource that overlaps two or more of the network energy modes, the SL-PRS transmit power for the SL-PRS symbols may be determined based on at least the following two approaches (being referred to as a first approach and a second approach below).

In some aspects, according to the first approach, the entire symbols in the SL-PRS resource may be transmitted based on an SL-PRS transmit power associated with one of the two or more network energy modes. For example, the UE 712 may be configured to transmit multiple SL-PRS symbols of a SL-PRS resource that overlaps two or more of the network energy modes. The UE 712 may transmit the multiple SL-PRS symbols based on a same SL-PRS transmit power associated with one of the two or more of the network energy modes. In some aspects, the one of the two or more of the network energy modes for the multiple SL-PRS symbols may be a starting network energy mode, a final network energy mode, a designated network energy mode configured by the TRP, the base station, or the location server, or a selected network energy mode selected by the UE, of the two or more of the network energy modes.

In some aspects, according to the second approach, the SL-PRS transmit power for each SL-PRS symbol may be adapted according to the corresponding operating network energy mode. For example, the UE 712 may transmit each of the multiple SL-PRS symbols based on a corresponding SL-PRS transmit power associated with a corresponding network energy mode of the corresponding SL-PRS symbol.

In some aspects, in a case that a UE is configured to transmit multiple groups of SL-PRS symbols of respective SL-PRS resources of a SL-PRS resource set that overlaps two or more of the network energy modes, the SL-PRS transmit power for the SL-PRS symbols may be determined based on at least the following two approaches (being referred to as a third approach and a fourth approach below).

In some aspects, according to the third approach, all SL-PRS resources may be transmitted based on an SL-PRS transmit power associated with one of the two or more network energy modes. For example, the UE 712 may transmit the multiple groups of SL-PRS symbols based on a same SL-PRS transmit power associated with one of the two or more of the network energy modes. In some aspects, the one of the two or more of the network energy modes for the multiple groups of SL-PRS symbols may be a starting network energy mode, a final network energy mode, a configured designated network energy mode configured by the TRP, a base station, or a location server, or a selected network energy mode selected by the UE, of the two or more of the network energy modes.

In some aspects, according to the fourth approach, the SL-PRS transmit power for each group of SL-PRS symbols may be adapted according to the corresponding one or more operating network energy modes. For example, the UE 712 may transmit each group of the multiple groups of SL-PRS symbols based on corresponding one or more SL-PRS transmit power associated with one or more network energy modes which the corresponding SL-PRS resource overlaps. Moreover, within each group of SL-PRS symbol corresponding to a SL-PRS resource, the SL-PRS transmit power may be determined based on the first approach or the second approach described above.

In some aspects, the NES modes may be based on allocating different bandwidth resources for the UE-TRP transmissions and SL transmissions. For example, the UE-TRP transmissions (as indicated by the arrows 740) and the SL positioning session (as indicated by the arrows 720) may operate in different or orthogonal bandwidth resources in order to manage, minimize, or eliminate possible interferences between the UE-TRP transmissions and the SL transmissions. For example, in a certain NES mode, the network may fall back to a bandwidth resource of 50 MHz from typical 100 MHz of a system bandwidth usable by the network, and the rest of the 50 MHz bandwidth resource may be allocated to SL-PRS transmissions, thus avoiding interference between the UE-TRP transmissions and the SL transmissions altogether. Accordingly, in some aspects, the UE may adopt different sets of strategies for a NES mode that has a dedicated bandwidth resource for the SL-PRS session versus another NES mode that has the UE-TRP transmissions and the SL-PRS transmissions sharing the same bandwidth resource.

For example, in some aspects, the TRP (e.g., the TRP 730) may engage in a NES mode for communication with the TRP, where the network energy saving mode may allocate the communication with the TRP within a first bandwidth resource and allocating a SL-PRS resource within a second bandwidth resource different from the first bandwidth resource. The TRP may transmit information indicating at least the SL-PRS resource to a UE (e.g., the UE 712) that is served by the TRP.

In some aspects, the UE (e.g., the UE 712) may receive the information from the TRP indicating the network energy mode for communication between the TRP and the UE, where a first portion of a system bandwidth for UE-TRP communication and a second portion of the system bandwidth for SL-PRS sessions are identifiable based on the network energy mode. The UE may communicate with the TRP over the first portion of the system bandwidth, and transmit or receive a SL-PRS over the second portion of the system bandwidth different from the first portion of the system bandwidth. In some aspects, the information may be included in one or more RRC messages, a positioning SIB, a dedicated message from a location server, or a MAC-CE or DCI message. In some aspects, the information may explicitly indicate a SL-PRS resource, including the second portion of the system bandwidth usable by the SL-PRS transmissions. In some aspects, the information may explicitly indicate the network energy mode adopted by the TRP, and the SL-PRS resource may be pre-configured in association with the network energy mode.

In some aspects, the UE (e.g., the UE 712) may set the SL-PRS transmit power according to a fixed value or a first equation based on the one of the network energy modes being a particular NES mode that allocates communication with the serving TRP within the first portion of the system bandwidth and allocates a SL-PRS resource for the at least one SL-PRS symbol within the second portion of the system bandwidth; and may set the SL-PRS transmit power according to a second equation different from the first equation based on the one of the network energy modes being not the particular NES mode. Accordingly, the TRP's capability of tolerating the interferences caused by the SL-PRS transmissions may be increased by avoiding performing the SL-PRS positioning session and the UE-TRP particular within the same bandwidth.

In some aspects, the power control strategy may be based on the TRP adopting one or more network energy saving modes in the slots where the SL resource is not configured, and adopting the baseline power mode (or a network energy mode that shares the same SL-PRS power control strategy with the baseline power mode) in the slots where the SL resource is configured. In other words, SL-PRS transmissions may have higher priority than adopting the NES modes (that require a PRS power control strategy different from that of the baseline power mode). In some aspects, the network may adjust its network energy mode setting or may operate in the baseline mode during the SL-PRS transmission window or slot. Accordingly, the TRP's capability of tolerating the interferences caused by the SL-PRS transmissions may be maintained by refraining from lowering the power levels for the UE-TRP transmissions.

For example, in some aspects, the communication between the TRP (e.g., the TRP 730) and the UE (e.g., the UE 712) may be set to use the baseline network energy mode for a slot at which a SL-PRS resource for the at least one SL-PRS symbol is allocated. In some aspects, the TRP (e.g., the TRP 730) may adopt the baseline network energy mode when the SL-PRS resources are allocated, and may adopt the one of the NES modes when the SL-PRS resources are not allocated.

Figure 8:
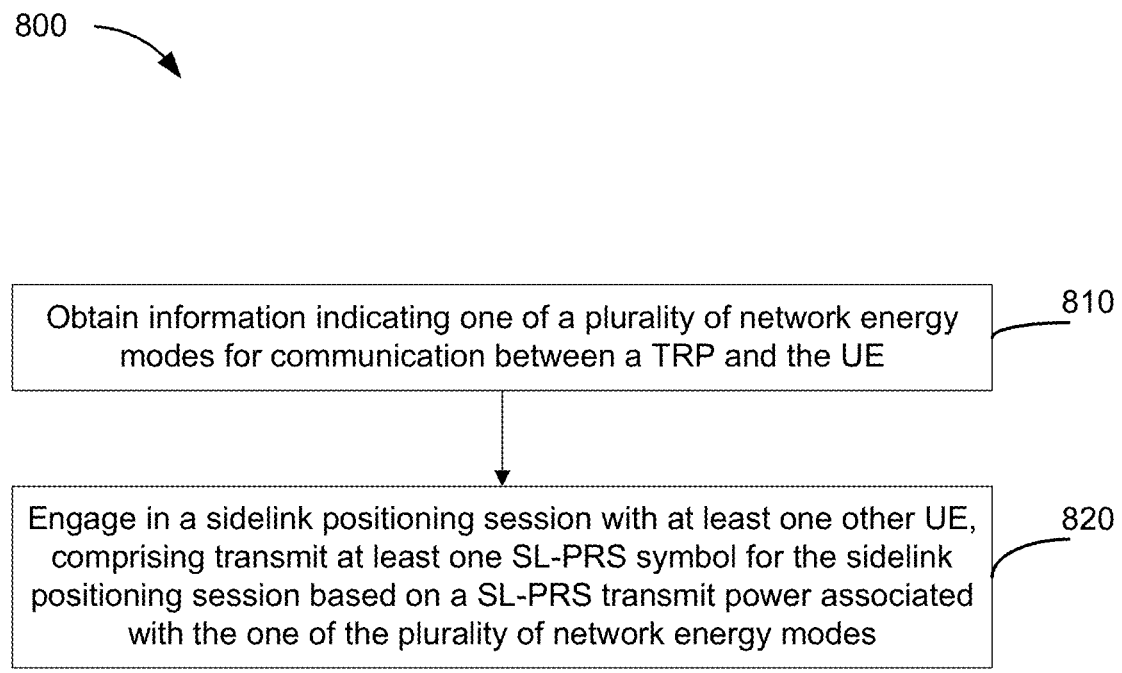
FIG. 8 illustrates an example method of operating a UE, according to aspects of the disclosure.

FIG. 8 illustrates an example method 800 of operating a UE, according to aspects of the disclosure. In some aspects, method 800 may be performed by a UE (e.g., any of the UE described herein). In some aspects, method 800 may correspond to the operations performed by the UE 712. In an aspect, method 800 may be performed by the one or more WWAN transceivers 310, the one or more processors 332, memory 340, and/or power control component 342, any or all of which may be considered means for performing one or more of the following operations of method 800.

At operation 810, the UE obtains information indicating one of a plurality of network energy modes for communication between a TRP and the UE. In some aspects, the plurality of network energy modes may include a baseline network energy mode and one or more NES modes. In some aspects, the one or more NES modes may modify the baseline network energy mode based on adjusting the bandwidth configuration, the time domain configuration, the antenna configuration, the beamforming configuration, the power level configuration, or any combination thereof. In some aspects, operation 810 may be performed by the one or more WWAN transceivers 310, the one or more processors 332, memory 340, and/or power control component 342, any or all of which may be considered means for performing operation 810.

At operation 820, the UE engages in a sidelink positioning session with at least one other UE. In some aspects, the UE may correspond to the UE 712, and the at least one other UE may correspond to the UE 716. In some aspects, the UE may transmit at least one SL-PRS symbol for the sidelink positioning session based on a SL-PRS transmit power associated with the one of the plurality of network energy modes. In some aspects, operation 820 may be performed by the one or more WWAN transceivers 310, the one or more processors 332, memory 340, and/or power control component 342, any or all of which may be considered means for performing operation 820.

In some aspects, the SL-PRS transmit power may be determined based on a corresponding power control strategy associated with one of a plurality of network energy modes. In some aspects, the power control strategy may correspond to setting the SL-PRS transmit power based on applying an offset value to a baseline value. In some aspects, the UE may identify the offset value in a lookup table specifying candidate offset values in association with at least a subset of the network energy modes. In some aspects, the baseline value may be based on a pre-defined, fixed value, a configured value from the TRP, a base station, or a location server, a power class of the UE, a regulatory power requirement for a frequency range for the at least one SL-PRS symbol (for the SL positioning session), or a combination thereof. In some aspects, the baseline value may be based on an Energy per Resource Element (EPRE) of a Sidelink Channel State Information Reference Signal (SL-CSI-RS), a Physical Sidelink Control Channel (PSCCH) DMRS, or a Physical Sidelink Shared Channel (PSSCH) DRMS transmitted by the UE.

In some aspects, the power control strategy may correspond to setting the SL-PRS transmit power based on obtaining a path-loss value for the UE, obtaining a path-loss coefficient or a path-loss offset value associated with the one of the network energy modes, obtaining a reference power calculated based on the path-loss value and based on the path-loss coefficient or the path-loss offset value, and setting the SL-PRS transmit power based on the reference power.

As will be appreciated, a technical advantage of the method 800 is directed to adjusting the SL-PRS power level in order to accommodate the possibly lowered capability of withstanding interferences caused by the SL-PRS transmissions during the UE-TRP transmissions, as a result of the TRP adopting a NES mode. Accordingly, by adjusting the power control strategy of the SL-PRS positioning session, the quality of the UE-TRP transmissions may be maintained while lowering the power consumption of the TRP.

Figure 9:
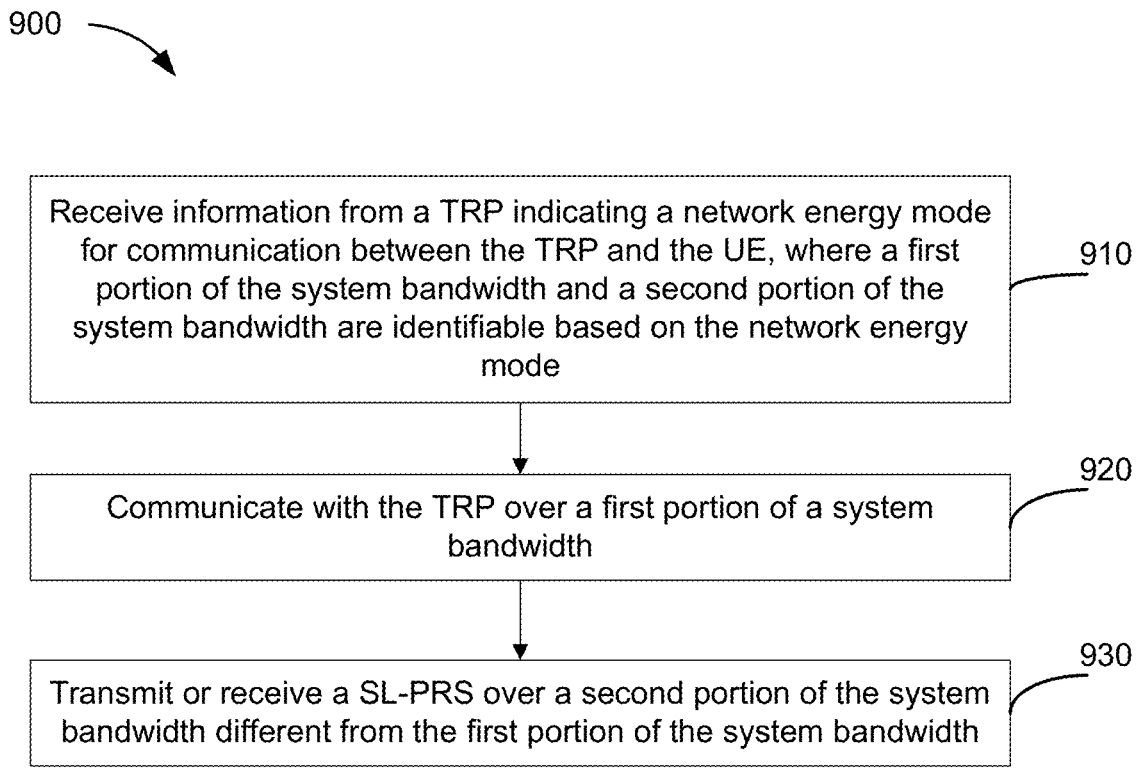
FIG. 9 illustrates another example method of operating a UE, according to aspects of the disclosure.

FIG. 9 illustrates another example method 900 of operating a UE, according to aspects of the disclosure. In some aspects, method 900 may be performed by a UE (e.g., any of the UE described herein). In some aspects, method 900 may correspond to the operations performed by the UE 712. In an aspect, method 900 may be performed by the one or more WWAN transceivers 310, the one or more processors 332, memory 340, and/or power control component 342, any or all of which may be considered means for performing one or more of the following operations of method 900.

At operation 910, the UE receives information from a TRP indicating a network energy mode for communication between the TRP and the UE. In some aspects, the UE may correspond to the UE 712, and the TRP may correspond to the TRP 730. In some aspects, a first portion of a system bandwidth and a second portion of the system bandwidth may be identifiable based on the network energy mode.

In some aspects, the information may be included in one or more RRC messages, a positioning SIB, a dedicated message from a location server, or a MAC-CE or DCI message. In some aspects, the information may explicitly indicate a SL-PRS resource, including the second portion of the system bandwidth for the SL-PRS transmissions. In some aspects, the information may explicitly indicate the network energy mode, and the SL-PRS resource may be pre-configured in association with the network energy mode. In some aspects, operation 910 may be performed by the one or more WWAN transceivers 310, the one or more processors 332, memory 340, and/or power control component 342, any or all of which may be considered means for performing operation 910.

At operation 920, the UE communicates with the TRP over the first portion of the system bandwidth. In some aspects, operation 920 may be performed by the one or more WWAN transceivers 310, the one or more processors 332, memory 340, and/or power control component 342, any or all of which may be considered means for performing operation 920.

At operation 930, the UE transmits or receives a SL-PRS over the second portion of the system bandwidth different from the first portion of the system bandwidth. In some aspects, operation 930 may be performed by the one or more WWAN transceivers 310, the one or more processors 332, memory 340, and/or power control component 342, any or all of which may be considered means for performing operation 930.

As will be appreciated, a technical advantage of the method 900 is directed to performing the SL-PRS positioning session and the UE-TRP transmissions within different portions of the system bandwidth. Accordingly, the TRP's capability of tolerating the interferences caused by the SL-PRS session may be increased by avoiding performing the SL-PRS session and the UE-TRP transmissions withing the same bandwidth resource.

Figure 10:
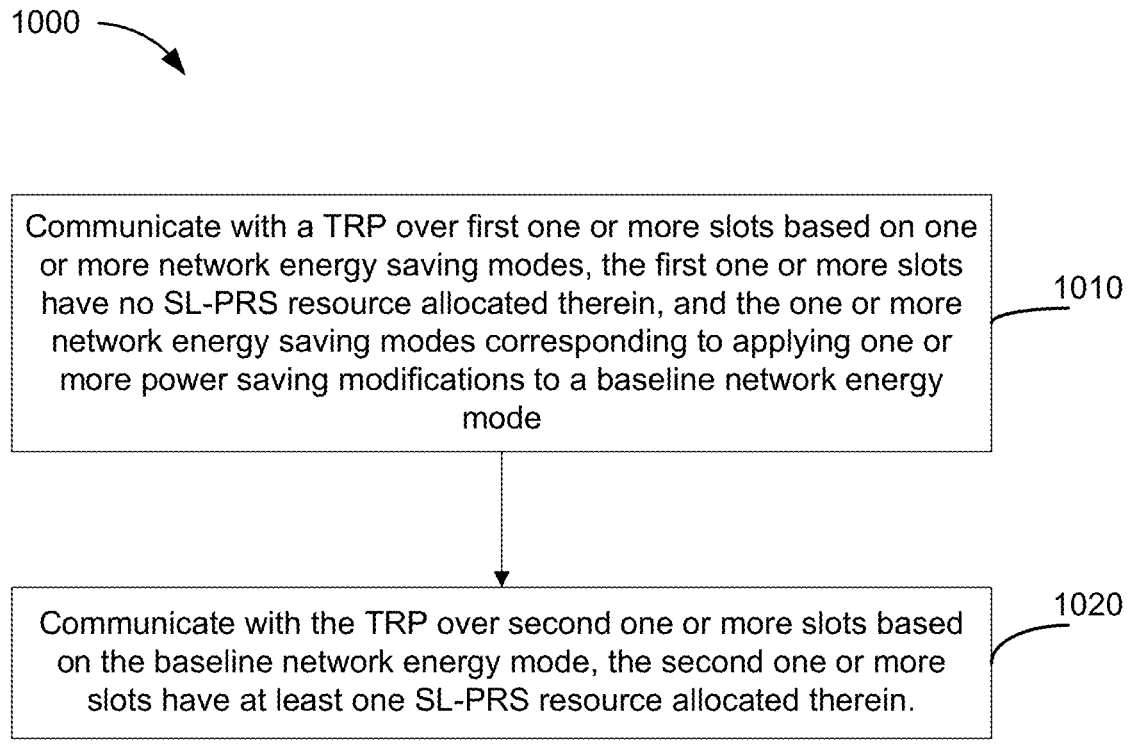
FIG. 10 illustrates another example method of operating a UE, according to aspects of the disclosure.

FIG. 10 illustrates another example method 1000 of operating a UE, according to aspects of the disclosure. In some aspects, method 1000 may be performed by a UE (e.g., any of the UE described herein). In some aspects, method 1000 may correspond to the operations performed by the UE 712. In an aspect, method 1000 may be performed by the one or more WWAN transceivers 310, the one or more processors 332, memory 340, and/or power control component 342, any or all of which may be considered means for performing one or more of the following operations of method 1000.

At operation 1010, the UE communicates with a TRP over first one or more slots based on one or more network energy saving modes, the first one or more slots have no SL-PRS resource allocated therein, and the one or more network energy saving modes corresponding to applying one or more power saving modifications to a baseline network energy mode. In some aspects, the UE may correspond to the UE 712, and the TRP may correspond to the TRP 730. In some aspects, operation 1010 may be performed by the one or more WWAN transceivers 310, the one or more processors 332, memory 340, and/or power control component 342, any or all of which may be considered means for performing operation 1010.

At operation 1020, the UE communicates with the TRP over second one or more slots based on the baseline network energy mode, the second one or more slots have at least one SL-PRS resource allocated therein. In some aspects, operation 1020 may be performed by the one or more WWAN transceivers 310, the one or more processors 332, memory 340, and/or power control component 342, any or all of which may be considered means for performing operation 1020.

In some aspects, the method 1000 may further includes the UE receiving information from the TRP indicating the one or more network energy saving modes for communication between the TRP and the UE, wherein the communicating with the TRP over the second one or more slots is based on the baseline network energy mode regardless of the indicated one or more network energy saving modes. In some aspects, the method 1000 may further includes the UE receiving first information from the TRP indicating the one or more network energy saving modes for communication between the TRP and the UE over the first one or more slots; and receiving second information from the TRP indicating the baseline network energy mode for communication between the TRP and the UE over the second one or more slots.

As will be appreciated, a technical advantage of the method 1000 is directed to adjusting the network energy mode setting to avoid adopting a power saving strategy (that may lower the capability of withstanding interferences) when the SL-PRS positioning session is performed. Accordingly, the TRP's capability of tolerating the interferences caused by the SL-PRS session may be maintained by refraining engaging in a power saving strategy for the UE-TRP transmissions (e.g., lowering the power levels for the signals between the UE and the TRP).

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of operating a user equipment (UE), comprising: obtaining information indicating one of a plurality of network energy modes for communication between a transmission-reception point (TRP) and the UE; and engaging in a sidelink positioning session with at least one other UE, comprising: transmitting at least one sidelink positioning reference signal (SL-PRS) symbol for the sidelink positioning session based on a SL-PRS transmit power associated with the one of the plurality of network energy modes.

Clause 2. The method of clause 1, further comprising: obtaining an offset value associated with the one of the network energy modes; and setting the SL-PRS transmit power based on applying the offset value to a baseline value.

Clause 3. The method of clause 2, further comprising determining the baseline value based on: a pre-defined, fixed value, a configured value from the TRP, a base station, or a location server, a power class of the UE, a regulatory power requirement for a frequency range for the at least one SL-PRS symbol, or a combination thereof.

Clause 4. The method of any of clauses 2 to 3, further comprising determining the baseline value based on an Energy per Resource Element (EPRE) of a Sidelink Channel State Information Reference Signal (SL-CSI-RS), a Physical Sidelink Control Channel (PSCCH) Demodulation Reference Signal (DMRS), or a Physical Sidelink Shared Channel (PSSCH) DRMS transmitted by the UE.

Clause 5. The method of any of clauses 2 to 4, wherein the obtaining the offset value associated with the one of the network energy modes comprises: identifying the offset value in a lookup table specifying candidate offset values in association with at least a subset of the network energy modes, or receiving the offset value via signaling from the TRP, a base station, or a location server.

Clause 6. The method of clause 5, wherein the lookup table is: prestored in the UE according to a communication standard, or configured by the TRP, the base station, or the location server.

Clause 7. The method of any of clauses 5 to 6, wherein the offset value is included in: a positioning system information block (SIB), a medium access control control element (MAC-CE) or downlink control information (DCI) message that also includes the information indicating the one of the network energy modes, one or more radio resource control (RRC) messages, or one or more Long Term Evolution positioning protocol (LPP) messages from the location server.

Clause 8. The method of clause 1, further comprising: obtaining a path-loss value for the UE; obtaining a path-loss coefficient or a path-loss offset value associated with the one of the network energy modes; obtaining a reference power calculated based on the path-loss value and based on the path-loss coefficient or the path-loss offset value; and setting the SL-PRS transmit power based on the reference power.

Clause 9. The method of clause 8, wherein: the obtaining the reference power comprises calculating the reference power based on an equation of $P_{REF}=P_t+\alpha_{NES}\times PL$, $P_{REF}$ representing the reference power, $P_t$ representing a target received power at the at least one other UE, $\alpha_{NES}$ representing the path-loss coefficient associated with the one of the network energy modes, and PL representing the path-loss value for the UE, and the setting the SL-PRS transmit power is based on a smaller one of a maximum permitted transmission power for the UE and the reference power.

Clause 10. The method of clause 8, wherein: the obtaining the reference power comprises calculating the reference power based on an equation of $P_{REF}=P_t+\alpha\times PL+GN_{NES}$, $P_{REF}$ representing the reference power, $P_t$ representing a target received power at the at least one other UE, $\alpha$ representing a path-loss coefficient that is not associated with the one of the network energy modes, PL representing the path-loss value for the UE, and $GN_{NES}$ representing the path-loss offset value associated with the one of the network energy modes, and the setting the SL-PRS transmit power is based on a smaller one of a maximum permitted transmission power for the UE and the reference power.

Clause 11. The method of any of clauses 8 to 10, wherein the path-loss coefficient or the path-loss offset value is: prestored in the UE according to a communication standard, configured by the TRP, a bases station, or a location server, included in one or more radio resource control (RRC) messages, included in a positioning system information block (SIB), included in a medium access control control element (MAC-CE) or downlink control information (DCI) message that also includes the information indicating the one of network energy modes, or included in one or more Long Term Evolution positioning protocol (LPP) messages from the location server.

Clause 12. The method of any of clauses 1 to 11, wherein: the UE is configured to transmit multiple SL-PRS symbols of a SL-PRS resource that overlaps two or more of the network energy modes, and the method comprises: transmitting the multiple SL-PRS symbols based on a same SL-PRS transmit power associated with one of the two or more of the network energy modes; or transmitting each of the multiple SL-PRS symbols based on a corresponding SL-PRS transmit power associated with a corresponding network energy mode of the corresponding SL-PRS symbol.

Clause 13. The method of clause 12, wherein the one of the two or more of the network energy modes for the multiple SL-PRS symbols is a starting network energy mode, a final network energy mode, a designated network energy mode configured by the TRP, a base station, or a location server, or a selected network energy mode selected by the UE, of the two or more of the network energy modes.

Clause 14. The method of any of clauses 1 to 11, wherein: the UE is configured to transmit multiple groups of SL-PRS symbols of respective SL-PRS resources of a SL-PRS resource set that overlaps two or more of the network energy modes, and the method further comprises: transmitting the multiple groups of SL-PRS symbols based on a same SL-PRS transmit power associated with one of the two or more of the network energy modes; or transmitting each group of the multiple groups of SL-PRS symbols based on corresponding one or more SL-PRS transmit power associated with one or more network energy modes which the corresponding SL-PRS resource overlaps.

Clause 15. The method of clause 14, wherein the one of the two or more of the network energy modes for the multiple groups of SL-PRS symbols is a starting network energy mode, a final network energy mode, a designated network energy mode configured by the TRP, a base station, or a location server, or a selected network energy mode selected by the UE, of the two or more of the network energy modes.

Clause 16. The method of clause 1, further comprising: setting the SL-PRS transmit power according to a fixed value or a first equation based on the one of the network energy modes being a network energy saving mode that allocates communication with the TRP within a first portion of a system bandwidth and allocates a SL-PRS resource for the at least one SL-PRS symbol within a second portion of the system bandwidth different from the first portion of the system bandwidth; and setting the SL-PRS transmit power according to a second equation different from the first equation based on the one of the network energy modes being not the network energy saving mode.

Clause 17. The method of clause 1, wherein: the network energy modes comprise a baseline network energy mode and one or more network energy saving modes, the one or more network energy saving modes corresponding to applying one or more power saving modifications to the baseline network energy mode, and the communication between the TRP and the UE is set to use the baseline network energy mode for a slot at which a SL-PRS resource for the at least one SL-PRS symbol is allocated.

Clause 18. A method of operating a user equipment (UE), comprising: receiving information from a transmission-reception point (TRP) indicating a network energy mode for communication between the TRP and the UE; communicating with the TRP over a first portion of a system bandwidth; and transmitting or receiving a sidelink positioning reference signal (SL-PRS) over a second portion of the system bandwidth different from the first portion of the system bandwidth, wherein the first portion of the system bandwidth and the second portion of the system bandwidth are identifiable based on the network energy mode.

Clause 19. The method of clause 18, wherein the information is included in: one or more radio resource control (RRC) messages, a positioning system information block (SIB), a dedicated message from a location server, or a medium access control control element (MAC-CE) or downlink control information (DCI) message.

Clause 20. The method of any of clauses 18 to 19, wherein: the information indicates a SL-PRS resource, or the information indicates the network energy mode, the SL-PRS resource being pre-configured in association with the network energy mode.

Clause 21. A method of operating a user equipment (UE), comprising: communicating with a transmission-reception point (TRP) over first one or more slots based on one or more network energy saving modes, the first one or more slots have no sidelink positioning reference signal (SL-PRS) resource allocated therein, and the one or more network energy saving modes corresponding to applying one or more power saving modifications to a baseline network energy mode; and communicating with the TRP over second one or more slots based on the baseline network energy mode, the second one or more slots have at least one SL-PRS resource allocated therein.

Clause 22. The method of clause 21, further comprising: receiving information from the TRP indicating the one or more network energy saving modes for communication between the TRP and the UE, wherein the communicating with the TRP over the second one or more slots is based on the baseline network energy mode regardless of the indicated one or more network energy saving modes.

Clause 23. The method of clause 21, further comprising: receiving first information from the TRP indicating the one or more network energy saving modes for communication between the TRP and the UE over the first one or more slots; and receiving second information from the TRP indicating the baseline network energy mode for communication between the TRP and the UE over the second one or more slots.

Clause 24. A user equipment (UE), comprising: a memory; at least one transceiver; and at least one processor communicatively coupled to the memory and the at least one transceiver, the at least one processor configured to: obtain information indicating one of a plurality of network energy modes for communication between a transmission-reception point (TRP) and the UE; and engage in a sidelink positioning session with at least one other UE, wherein the at least one processor is configured to: transmit, via the at least one transceiver, at least one sidelink positioning reference signal (SL-PRS) symbol for the sidelink positioning session based on a SL-PRS transmit power associated with the one of the plurality of network energy modes.

Clause 25. The UE of clause 24, wherein the at least one processor is further configured to: obtain an offset value associated with the one of the network energy modes; and set the SL-PRS transmit power based on applying the offset value to a baseline value.

Clause 26. The UE of clause 25, wherein the at least one processor is further configured to determine the baseline value based on: a pre-defined, fixed value, a configured value from the TRP, a base station, or a location server, a power class of the UE, a regulatory power requirement for a frequency range for the at least one SL-PRS symbol, or a combination thereof.

Clause 27. The UE of any of clauses 25 to 26, wherein the at least one processor is further configured to determine the baseline value based on an Energy per Resource Element (EPRE) of a Sidelink Channel State Information Reference Signal (SL-CSI-RS), a Physical Sidelink Control Channel (PSCCH) Demodulation Reference Signal (DMRS), or a Physical Sidelink Shared Channel (PSSCH) DRMS transmitted by the UE.

Clause 28. The UE of any of clauses 25 to 27, wherein the at least one processor configured to obtain the offset value associated with the one of the network energy modes is further configured to: identify the offset value in a lookup table specifying candidate offset values in association with at least a subset of the network energy modes, or receive, via the at least one transceiver, the offset value via signaling from the TRP, a base station, or a location server.

Clause 29. The UE of clause 28, wherein the lookup table is: prestored in the UE according to a communication standard, or configured by the TRP, the base station, or the location server.

Clause 30. The UE of any of clauses 28 to 29, wherein the offset value is included in: a positioning system information block (SIB), a medium access control control element (MAC-CE) or downlink control information (DCI) message that also includes the information indicating the one of the network energy modes, one or more radio resource control (RRC) messages, or one or more Long Term Evolution positioning protocol (LPP) messages from the location server.

Clause 31. The UE of clause 24, wherein the at least one processor is further configured to: obtain a path-loss value for the UE; obtain a path-loss coefficient or a path-loss offset value associated with the one of the network energy modes; obtain a reference power calculated based on the path-loss value and based on the path-loss coefficient or the path-loss offset value; and set the SL-PRS transmit power based on the reference power.

Clause 32. The UE of clause 31, wherein: the at least one processor configured to obtain the reference power is further configured to calculate the reference power based on an equation of $P_{REF}=P_t+\alpha_{NES} \times PL$, $P_{REF}$ representing the reference power, $P_t$ representing a target received power at the at least one other UE, $\alpha_{NES}$ representing the path-loss coefficient associated with the one of the network energy modes, and PL representing the path-loss value for the UE, and the at least one processor is configured to set the SL-PRS transmit power based on a smaller one of a maximum permitted transmission power for the UE and the reference power.

Clause 33. The UE of clause 31, wherein: the at least one processor configured to obtain the reference power is further configured to calculate the reference power based on an equation of $P_{REF}=P_t+\alpha \times PL+GN_{NES}$, $P_{REF}$ representing the reference power, $P_t$ representing a target received power at the at least one other UE, $\alpha$ representing a path-loss coefficient that is not associated with the one of the network energy modes, PL representing the path-loss value for the UE, and $GN_{NES}$ representing the path-loss offset value associated with the one of the network energy modes, and the at least one processor is configured to set the SL-PRS transmit power based on a smaller one of a maximum permitted transmission power for the UE and the reference power.

Clause 34. The UE of any of clauses 31 to 33, wherein the path-loss coefficient or the path-loss offset value is: prestored in the UE according to a communication standard, configure by the TRP, a bases station, or a location server, include in one or more radio resource control (RRC) messages, include in a positioning system information block (SIB), include in a medium access control control element (MAC-CE) or downlink control information (DCI) message that also includes the information indicating the one of network energy modes, or include in one or more Long Term Evolution positioning protocol (LPP) messages from the location server.

Clause 35. The UE of any of clauses 24 to 34, wherein: the at least one processor is configured to transmit, via the at least one transceiver, multiple SL-PRS symbols of a SL-PRS resource that overlaps two or more of the network energy modes, and the at least one processor is configured to: transmit, via the at least one transceiver, the multiple SL-PRS symbols based on a same SL-PRS transmit power associated with one of the two or more of the network energy modes; or transmit, via the at least one transceiver, each of the multiple SL-PRS symbols based on a corresponding SL-PRS transmit power associated with a corresponding network energy mode of the corresponding SL-PRS symbol.

Clause 36. The UE of clause 35, wherein the one of the two or more of the network energy modes for the multiple SL-PRS symbols is a starting network energy mode, a final network energy mode, a designated network energy mode configured by the TRP, a base station, or a location server, or a selected network energy mode selected by the UE, of the two or more of the network energy modes.

Clause 37. The UE of any of clauses 24 to 34, wherein: the at least one processor is configured to transmit, via the at least one transceiver, multiple groups of SL-PRS symbols of respective SL-PRS resources of a SL-PRS resource set that overlaps two or more of the network energy modes, and the at least one processor is configured to: transmit, via the at least one transceiver, the multiple groups of SL-PRS symbols based on a same SL-PRS transmit power associated with one of the two or more of the network energy modes; or transmit, via the at least one transceiver, each group of the multiple groups of SL-PRS symbols based on corresponding one or more SL-PRS transmit power associated with one or more network energy modes which the corresponding SL-PRS resource overlaps.

Clause 38. The UE of clause 37, wherein the one of the two or more of the network energy modes for the multiple groups of SL-PRS symbols is a starting network energy mode, a final network energy mode, a designated network energy mode configured by the TRP, a base station, or a location server, or a selected network energy mode selected by the UE, of the two or more of the network energy modes.

Clause 39. The UE of clause 24, wherein the at least one processor is further configured to: set the SL-PRS transmit power according to a fixed value or a first equation based on the one of the network energy modes being a network energy saving mode that allocates communication with the TRP within a first portion of a system bandwidth and allocates a SL-PRS resource for the at least one SL-PRS symbol within a second portion of the system bandwidth different from the first portion of the system bandwidth; and set the SL-PRS transmit power according to a second equation different from the first equation based on the one of the network energy modes being not the network energy saving mode.

Clause 40. The UE of clause 24, wherein: the network energy modes comprise a baseline network energy mode and one or more network energy saving modes, the one or more network energy saving modes corresponding to applying one or more power saving modifications to the baseline network energy mode, and the communication between the TRP and the UE is set to use the baseline network energy mode for a slot at which a SL-PRS resource for the at least one SL-PRS symbol is allocated.

Clause 41. A user equipment (UE), comprising: a memory; at least one transceiver; and at least one processor communicatively coupled to the memory and the at least one transceiver, the at least one processor configured to: receive, via the at least one transceiver, information from a transmission-reception point (TRP) indicating a network energy mode for communication between the TRP and the UE; communicate, via the at least one transceiver, with the TRP over a first portion of a system bandwidth; and transmit or receive, via the at least one transceiver, a sidelink positioning reference signal (SL-PRS) over a second portion of the system bandwidth different from the first portion of the system bandwidth, wherein the first portion of the system bandwidth and the second portion of the system bandwidth are identifiable based on the network energy mode.

Clause 42. The UE of clause 41, wherein the information is included in: one or more radio resource control (RRC) messages, a positioning system information block (SIB), a dedicated message from a location server, or a medium access control control element (MAC-CE) or downlink control information (DCI) message.

Clause 43. The UE of any of clauses 41 to 42, wherein: the information indicates a SL-PRS resource, or the information indicates the network energy mode, the SL-PRS resource being pre-configured in association with the network energy mode.

Clause 44. A user equipment (UE), comprising: a memory; at least one transceiver; and at least one processor communicatively coupled to the memory and the at least one transceiver, the at least one processor configured to: communicate, via the at least one transceiver, with a transmission-reception point (TRP) over first one or more slots based on one or more network energy saving modes, the first one or more slots have no sidelink positioning reference signal (SL-PRS) resource allocated therein, and the one or more network energy saving modes corresponding to applying one or more power saving modifications to a baseline network energy mode; and communicate, via the at least one transceiver, with the TRP over second one or more slots based on the baseline network energy mode, the second one or more slots have at least one SL-PRS resource allocated therein.

Clause 45. The UE of clause 44, wherein the at least one processor is further configured to: receive information from the TRP indicating the one or more network energy saving modes for communication between the TRP and the UE, wherein the communicating with the TRP over the second one or more slots is based on the baseline network energy mode regardless of the indicated one or more network energy saving modes.

Clause 46. The UE of clause 44, wherein the at least one processor is further configured to: receive first information from the TRP indicating the one or more network energy saving modes for communication between the TRP and the UE over the first one or more slots; and receive second information from the TRP indicating the baseline network energy mode for communication between the TRP and the UE over the second one or more slots.

Clause 47. A user equipment (UE), comprising: means for obtaining information indicating one of a plurality of network energy modes for communication between a transmission-reception point (TRP) and the UE; and means for engaging in a sidelink positioning session with at least one other UE, comprising: means for transmitting at least one sidelink positioning reference signal (SL-PRS) symbol for the sidelink positioning session based on a SL-PRS transmit power associated with the one of the plurality of network energy modes.

Clause 48. The UE of clause 47, further comprising: means for obtaining an offset value associated with the one of the network energy modes; and means for setting the SL-PRS transmit power based on applying the offset value to a baseline value.

Clause 49. The UE of clause 48, further comprising means for determining the baseline value based on: a predefined, fixed value, a configured value from the TRP, a base station, or a location server, a power class of the UE, a regulatory power requirement for a frequency range for the at least one SL-PRS symbol, or a combination thereof.

Clause 50. The UE of any of clauses 48 to 49, further comprising means for determining the baseline value based on an Energy per Resource Element (EPRE) of a Sidelink Channel State Information Reference Signal (SL-CSI-RS), a Physical Sidelink Control Channel (PSCCH) Demodulation Reference Signal (DMRS), or a Physical Sidelink Shared Channel (PSSCH) DRMS transmitted by the UE.

Clause 51. The UE of any of clauses 48 to 50, wherein the means for obtaining the offset value associated with the one of the network energy modes comprises: means for identifying the offset value in a lookup table specifying candidate offset values in association with at least a subset of the network energy modes, or means for receiving the offset value via signaling from the TRP, a base station, or a location server.

Clause 52. The UE of clause 51, wherein the lookup table is: prestored in the UE according to a communication standard, or configured by the TRP, the base station, or the location server.

Clause 53. The UE of any of clauses 51 to 52, wherein the offset value is included in: a positioning system information block (SIB), a medium access control control element (MAC-CE) or downlink control information (DCI) message that also includes the information indicating the one of the network energy modes, one or more radio resource control (RRC) messages, or one or more Long Term Evolution positioning protocol (LPP) messages from the location server.

Clause 54. The UE of clause 47, further comprising: means for obtaining a path-loss value for the UE; means for obtaining a path-loss coefficient or a path-loss offset value associated with the one of the network energy modes; means for obtaining a reference power calculated based on the path-loss value and based on the path-loss coefficient or the path-loss offset value; and means for setting the SL-PRS transmit power based on the reference power.

Clause 55. The UE of clause 54, wherein: the means for obtaining the reference power comprises means for calculating the reference power based on an equation of $P_{REF}=P_t+\alpha_{NES}\times PL$, $P_{REF}$ representing the reference power, $P_t$ representing a target received power at the at least one other UE, $\alpha_{NES}$ representing the path-loss coefficient associated with the one of the network energy modes, and PL representing the path-loss value for the UE, and the means for setting the SL-PRS transmit power sets the SL-PRS transmit power based on a smaller one of a maximum permitted transmission power for the UE and the reference power.

Clause 56. The UE of clause 54, wherein: the means for obtaining the reference power comprises means for calculating the reference power based on an equation of $P_{REF}=P_t+\alpha\times PL+GN_{NES}$, $P_{REF}$ representing the reference power, $P_t$ representing a target received power at the at least one other UE, $\alpha$ representing a path-loss coefficient that is not associated with the one of the network energy modes, PL representing the path-loss value for the UE, and $GN_{NES}$ representing the path-loss offset value associated with the one of the network energy modes, and the means for setting the SL-PRS transmit power sets the SL-PRS transmit power based on a smaller one of a maximum permitted transmission power for the UE and the reference power.

Clause 57. The UE of any of clauses 54 to 56, wherein the path-loss coefficient or the path-loss offset value is: prestored in the UE according to a communication standard, configured by the TRP, a bases station, or a location server, included in one or more radio resource control (RRC) messages, included in a positioning system information block (SIB), included in a medium access control control element (MAC-CE) or downlink control information (DCI) message that also includes the information indicating the one of network energy modes, or included in one or more Long Term Evolution positioning protocol (LPP) messages from the location server.

Clause 58. The UE of any of clauses 47 to 57, wherein: the UE is configured to transmit multiple SL-PRS symbols of a SL-PRS resource that overlaps two or more of the network energy modes, and the UE further comprises: means for transmitting the multiple SL-PRS symbols based on a same SL-PRS transmit power associated with one of the two or more of the network energy modes; or means for transmitting each of the multiple SL-PRS symbols based on a corresponding SL-PRS transmit power associated with a corresponding network energy mode of the corresponding SL-PRS symbol.

Clause 59. The UE of clause 58, wherein the one of the two or more of the network energy modes for the multiple SL-PRS symbols is a starting network energy mode, a final network energy mode, a designated network energy mode configured by the TRP, a base station, or a location server, or a selected network energy mode selected by the UE, of the two or more of the network energy modes.

Clause 60. The UE of any of clauses 47 to 57, wherein: the UE is configured to transmit multiple groups of SL-PRS symbols of respective SL-PRS resources of a SL-PRS resource set that overlaps two or more of the network energy modes, and the UE further comprises: means for transmitting the multiple groups of SL-PRS symbols based on a same SL-PRS transmit power associated with one of the two or more of the network energy modes; or means for transmitting each group of the multiple groups of SL-PRS symbols based on corresponding one or more SL-PRS transmit power associated with one or more network energy modes which the corresponding SL-PRS resource overlaps.

Clause 61. The UE of clause 60, wherein the one of the two or more of the network energy modes for the multiple groups of SL-PRS symbols is a starting network energy mode, a final network energy mode, a designated network energy mode configured by the TRP, a base station, or a location server, or a selected network energy mode selected by the UE, of the two or more of the network energy modes.

Clause 62. The UE of clause 47, further comprising: means for setting the SL-PRS transmit power according to a fixed value or a first equation based on the one of the network energy modes being a network energy saving mode that allocates communication with the TRP within a first portion of a system bandwidth and allocates a SL-PRS resource for the at least one SL-PRS symbol within a second portion of the system bandwidth different from the first portion of the system bandwidth; and means for setting the SL-PRS transmit power according to a second equation different from the first equation based on the one of the network energy modes being not the network energy saving mode.

Clause 63. The UE of clause 47, wherein: the network energy modes comprise a baseline network energy mode and one or more network energy saving modes, the one or more network energy saving modes corresponding to applying one or more power saving modifications to the baseline network energy mode, and the communication between the TRP and the UE is set to use the baseline network energy mode for a slot at which a SL-PRS resource for the at least one SL-PRS symbol is allocated.

Clause 64. A user equipment (UE), comprising: means for receiving information from a transmission-reception point (TRP) indicating a network energy mode for communication between the TRP and the UE; means for communicating with the TRP over a first portion of a system bandwidth; and means for transmitting or receiving a sidelink positioning reference signal (SL-PRS) over a second portion of the system bandwidth different from the first portion of the system bandwidth, wherein the first portion of the system bandwidth and the second portion of the system bandwidth are identifiable based on the network energy mode.

Clause 65. The UE of clause 64, wherein the information is included in: one or more radio resource control (RRC) messages, a positioning system information block (SIB), a dedicated message from a location server, or a medium access control control element (MAC-CE) or downlink control information (DCI) message.

Clause 66. The UE of any of clauses 64 to 65, wherein: the information indicates a SL-PRS resource, or the information indicates the network energy mode, the SL-PRS resource being pre-configured in association with the network energy mode.

Clause 67. A user equipment (UE), comprising: means for communicating with a transmission-reception point (TRP) over first one or more slots based on one or more network energy saving modes, the first one or more slots have no sidelink positioning reference signal (SL-PRS) resource allocated therein, and the one or more network energy saving modes corresponding to applying one or more power saving modifications to a baseline network energy mode; and means for communicating with the TRP over second one or more slots based on the baseline network energy mode, the second one or more slots have at least one SL-PRS resource allocated therein.

Clause 68. The UE of clause 67, further comprising: means for receiving information from the TRP indicating the one or more network energy saving modes for communication between the TRP and the UE, wherein the communicating with the TRP over the second one or more slots is based on the baseline network energy mode regardless of the indicated one or more network energy saving modes.

Clause 69. The UE of clause 67, further comprising: means for receiving first information from the TRP indicating the one or more network energy saving modes for communication between the TRP and the UE over the first one or more slots; and means for receiving second information from the TRP indicating the baseline network energy mode for communication between the TRP and the UE over the second one or more slots.

Clause 70. A non-transitory computer-readable medium storing computer-executable instructions that, when executed by a user equipment (UE), cause the UE to: obtain information indicating one of a plurality of network energy modes for communication between a transmission-reception point (TRP) and the UE; and engage in a sidelink positioning session with at least one other UE, wherein the instructions further cause the UE to: transmit at least one sidelink positioning reference signal (SL-PRS) symbol for the sidelink positioning session based on a SL-PRS transmit power associated with the one of the plurality of network energy modes.

Clause 71. The non-transitory computer-readable medium of clause 70, further comprising computer-executable instructions that, when executed by the UE, cause the UE to: obtain an offset value associated with the one of the network energy modes; and set the SL-PRS transmit power based on applying the offset value to a baseline value.

Clause 72. The non-transitory computer-readable medium of clause 71, further comprising computer-executable instructions that, when executed by the UE, cause the UE to determine the baseline value based on: a pre-defined, fixed value, a configured value from the TRP, a base station, or a location server, a power class of the UE, a regulatory power requirement for a frequency range for the at least one SL-PRS symbol, or a combination thereof.

Clause 73. The non-transitory computer-readable medium of any of clauses 71 to 72, further comprising computer-executable instructions that, when executed by the UE, cause the UE to determine the baseline value based on an Energy per Resource Element (EPRE) of a Sidelink Channel State Information Reference Signal (SL-CSI-RS), a Physical Sidelink Control Channel (PSCCH) Demodulation Reference Signal (DMRS), or a Physical Sidelink Shared Channel (PSSCH) DRMS transmitted by the UE.

Clause 74. The non-transitory computer-readable medium of any of clauses 71 to 73, wherein the instructions causing the UE to obtain the offset value associated with the one of the network energy modes comprises instructions causing the UE to: identify the offset value in a lookup table specifying candidate offset values in association with at least a subset of the network energy modes, or receive the offset value via signaling from the TRP, a base station, or a location server.

Clause 75. The non-transitory computer-readable medium of clause 74, wherein the lookup table is: prestored in the UE according to a communication standard, or configured by the TRP, the base station, or the location server.

Clause 76. The non-transitory computer-readable medium of any of clauses 74 to 75, wherein the offset value is included in: a positioning system information block (SIB), a medium access control control element (MAC-CE) or downlink control information (DCI) message that also includes the information indicating the one of the network energy modes, one or more radio resource control (RRC) messages, or one or more Long Term Evolution positioning protocol (LPP) messages from the location server.

Clause 77. The non-transitory computer-readable medium of clause 70, further comprising computer-executable instructions that, when executed by the UE, cause the UE to: obtain a path-loss value for the UE; obtain a path-loss coefficient or a path-loss offset value associated with the one of the network energy modes; obtain a reference power calculated based on the path-loss value and based on the path-loss coefficient or the path-loss offset value; and set the SL-PRS transmit power based on the reference power.

Clause 78. The non-transitory computer-readable medium of clause 77, wherein: the instructions causing the UE to obtain the reference power comprises instructions causing the UE to calculate the reference power based on an equation of $P_{REF}=P_t+\alpha_{NES}\times PL$, $P_{REF}$ representing the reference power, $P_t$ representing a target received power at the at least one other UE, $\alpha_{NES}$ representing the path-loss coefficient associated with the one of the network energy modes, and PL representing the path-loss value for the UE, and the instructions causing the UE to set the SL-PRS transmit power comprises instructions causing the UE to set the SL-PRS transmit power based on a smaller one of a maximum permitted transmission power for the UE and the reference power.

Clause 79. The non-transitory computer-readable medium of clause 77, wherein: the instructions causing the UE to obtain the reference power comprises instructions causing the UE to calculate the reference power based on an equation of $P_{REF}=P_t+\alpha\times PL+GN_{NES}$, $P_{REF}$ representing the reference power, $P_t$ representing a target received power at the at least one other UE, $\alpha$ representing a path-loss coefficient that is not associated with the one of the network energy modes, PL representing the path-loss value for the UE, and $GN_{NES}$ representing the path-loss offset value associated with the one of the network energy modes, and the instructions causing the UE to set the SL-PRS transmit power comprises instructions causing the UE to set the SL-PRS transmit power based on a smaller one of a maximum permitted transmission power for the UE and the reference power.

Clause 80. The non-transitory computer-readable medium of any of clauses 77 to 79, wherein the path-loss coefficient or the path-loss offset value is: prestored in the UE according to a communication standard, configured by the TRP, a bases station, or a location server, included in one or more radio resource control (RRC) messages, included in a positioning system information block (SIB), included in a medium access control control element (MAC-CE) or downlink control information (DCI) message that also includes the information indicating the one of network energy modes, or included in one or more Long Term Evolution positioning protocol (LPP) messages from the location server.

Clause 81. The non-transitory computer-readable medium of any of clauses 70 to 80, wherein: the UE is configured to transmit multiple SL-PRS symbols of a SL-PRS resource that overlaps two or more of the network energy modes, and the instructions further cause the UE to: transmit the multiple SL-PRS symbols based on a same SL-PRS transmit power associated with one of the two or more of the network energy modes; or transmit each of the multiple SL-PRS symbols based on a corresponding SL-PRS transmit power associated with a corresponding network energy mode of the corresponding SL-PRS symbol.

Clause 82. The non-transitory computer-readable medium of clause 81, wherein the one of the two or more of the network energy modes for the multiple SL-PRS symbols is a starting network energy mode, a final network energy mode, a designated network energy mode configured by the TRP, a base station, or a location server, or a selected network energy mode selected by the UE, of the two or more of the network energy modes.

Clause 83. The non-transitory computer-readable medium of any of clauses 70 to 80, wherein: the UE is configured to transmit multiple groups of SL-PRS symbols of respective SL-PRS resources of a SL-PRS resource set that overlaps two or more of the network energy modes, and the instructions further cause the UE to: transmit the multiple groups of SL-PRS symbols based on a same SL-PRS transmit power associated with one of the two or more of the network energy modes; or transmit each group of the multiple groups of SL-PRS symbols based on corresponding one or more SL-PRS transmit power associated with one or more network energy modes which the corresponding SL-PRS resource overlaps.

Clause 84. The non-transitory computer-readable medium of clause 83, wherein the one of the two or more of the network energy modes for the multiple groups of SL-PRS symbols is a starting network energy mode, a final network energy mode, a designated network energy mode configured by the TRP, a base station, or a location server, or a selected network energy mode selected by the UE, of the two or more of the network energy modes.

Clause 85. The non-transitory computer-readable medium of clause 70, further comprising computer-executable instructions that, when executed by the UE, cause the UE to: set the SL-PRS transmit power according to a fixed value or a first equation based on the one of the network energy modes being a network energy saving mode that allocates communication with the TRP within a first portion of a system bandwidth and allocates a SL-PRS resource for the at least one SL-PRS symbol within a second portion of the system bandwidth different from the first portion of the system bandwidth; and set the SL-PRS transmit power according to a second equation different from the first equation based on the one of the network energy modes being not the network energy saving mode.

Clause 86. The non-transitory computer-readable medium of clause 70, wherein: the network energy modes comprise a baseline network energy mode and one or more network energy saving modes, the one or more network energy saving modes corresponding to applying one or more power saving modifications to the baseline network energy mode, and the communication between the TRP and the UE is set to use the baseline network energy mode for a slot at which a SL-PRS resource for the at least one SL-PRS symbol is allocated.

Clause 87. A non-transitory computer-readable medium storing computer-executable instructions that, when executed by a user equipment (UE), cause the UE to: receive information from a transmission-reception point (TRP) indicating a network energy mode for communication between the TRP and the UE; communicate with the TRP over a first portion of a system bandwidth; and transmit or receive a sidelink positioning reference signal (SL-PRS) over a second portion of the system bandwidth different from the first portion of the system bandwidth, wherein the first portion of the system bandwidth and the second portion of the system bandwidth are identifiable based on the network energy mode.

Clause 88. The non-transitory computer-readable medium of clause 87, wherein the information is included in: one or more radio resource control (RRC) messages, a positioning system information block (SIB), a dedicated message from a location server, or a medium access control control element (MAC-CE) or downlink control information (DCI) message.

Clause 89. The non-transitory computer-readable medium of any of clauses 87 to 88, wherein: the information indicates a SL-PRS resource, or the information indicates the network energy mode, the SL-PRS resource being pre-configured in association with the network energy mode.

Clause 90. A non-transitory computer-readable medium storing computer-executable instructions that, when executed by a user equipment (UE), cause the UE to: communicate with a transmission-reception point (TRP) over first one or more slots based on one or more network energy saving modes, the first one or more slots have no sidelink positioning reference signal (SL-PRS) resource allocated therein, and the one or more network energy saving modes corresponding to applying one or more power saving modifications to a baseline network energy mode; and communicate with the TRP over second one or more slots based on the baseline network energy mode, the second one or more slots have at least one SL-PRS resource allocated therein.

Clause 91. The non-transitory computer-readable medium of clause 90, further comprising computer-executable instructions that, when executed by the UE, cause the UE to: receive information from the TRP indicating the one or more network energy saving modes for communication between the TRP and the UE, wherein the communicating with the TRP over the second one or more slots is based on the baseline network energy mode regardless of the indicated one or more network energy saving modes.

Clause 92. The non-transitory computer-readable medium of clause 90, further comprising computer-executable instructions that, when executed by the UE, cause the UE to: receive first information from the TRP indicating the one or more network energy saving modes for communication between the TRP and the UE over the first one or more slots; and receive second information from the TRP indicating the baseline network energy mode for communication between the TRP and the UE over the second one or more slots.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a user equipment (UE), comprising:
    obtaining information indicating one of a plurality of network energy modes for communication between a transmission-reception point (TRP) and the UE; and
    engaging in a sidelink positioning session with at least one other UE, comprising:
        transmitting at least one sidelink positioning reference signal (SL-PRS) symbol for the sidelink positioning session based on a SL-PRS transmit power associated with the one of the plurality of network energy modes.

2. The method of claim 1, further comprising:
    obtaining an offset value associated with the one of the network energy modes; and
    setting the SL-PRS transmit power based on applying the offset value to a baseline value.

3. The method of claim 2, further comprising determining the baseline value based on:
    a pre-defined, fixed value,
    a configured value from the TRP, a base station, or a location server,
    a power class of the UE,
    a regulatory power requirement for a frequency range for the at least one SL-PRS symbol, or
    a combination thereof.

4. The method of claim 2, further comprising determining the baseline value based on an Energy per Resource Element (EPRE) of a Sidelink Channel State Information Reference Signal (SL-CSI-RS), a Physical Sidelink Control Channel (PSCCH) Demodulation Reference Signal (DMRS), or a Physical Sidelink Shared Channel (PSSCH) DRMS transmitted by the UE.

5. The method of claim 2, wherein the obtaining the offset value associated with the one of the network energy modes comprises:
    identifying the offset value in a lookup table specifying candidate offset values in association with at least a subset of the network energy modes, or
    receiving the offset value via signaling from the TRP, a base station, or a location server.

6. The method of claim 5, wherein the lookup table is:
    prestored in the UE according to a communication standard, or
    configured by the TRP, the base station, or the location server.

7. The method of claim 5, wherein the offset value is included in:
a positioning system information block (SIB),
a medium access control control element (MAC-CE) or downlink control information (DCI) message that also includes the information indicating the one of the network energy modes,
one or more radio resource control (RRC) messages, or
one or more Long Term Evolution positioning protocol (LPP) messages from the location server.

8. The method of claim 1, further comprising:
obtaining a path-loss value for the UE;
obtaining a path-loss coefficient or a path-loss offset value associated with the one of the network energy modes;
obtaining a reference power calculated based on the path-loss value and based on the path-loss coefficient or the path-loss offset value; and
setting the SL-PRS transmit power based on the reference power.

9. The method of claim 8, wherein:
the obtaining the reference power comprises calculating the reference power based on an equation of $P_{REF} = P_t + \alpha_{NES} \times PL,$ $P_{REF}$ representing the reference power,
$P_t$ representing a target received power at the at least one other UE,
$\alpha_{NES}$ representing the path-loss coefficient associated with the one of the network energy modes, and
PL representing the path-loss value for the UE, and
the setting the SL-PRS transmit power is based on a smaller one of a maximum permitted transmission power for the UE and the reference power.

10. The method of claim 8, wherein:
the obtaining the reference power comprises calculating the reference power based on an equation of $P_{REF} = P_t + \alpha \times PL + GN_{NES},$ $P_{REF}$ representing the reference power,
$P_t$ representing a target received power at the at least one other UE,
$\alpha$ representing a path-loss coefficient that is not associated with the one of the network energy modes,
PL representing the path-loss value for the UE, and
$GN_{NES}$ representing the path-loss offset value associated with the one of the network energy modes, and
the setting the SL-PRS transmit power is based on a smaller one of a maximum permitted transmission power for the UE and the reference power.

11. The method of claim 8, wherein the path-loss coefficient or the path-loss offset value is:
prestored in the UE according to a communication standard,
configured by the TRP, a bases station, or a location server,
included in one or more radio resource control (RRC) messages,
included in a positioning system information block (SIB),
included in a medium access control control element (MAC-CE) or downlink control information (DCI) message that also includes the information indicating the one of network energy modes, or
included in one or more Long Term Evolution positioning protocol (LPP) messages from the location server.

12. The method of claim 1, wherein:
the UE is configured to transmit multiple SL-PRS symbols of a SL-PRS resource that overlaps two or more of the network energy modes, and
the method comprises:
transmitting the multiple SL-PRS symbols based on a same SL-PRS transmit power associated with one of the two or more of the network energy modes; or
transmitting each of the multiple SL-PRS symbols based on a corresponding SL-PRS transmit power associated with a corresponding network energy mode of the corresponding SL-PRS symbol.

13. The method of claim 12, wherein the one of the two or more of the network energy modes for the multiple SL-PRS symbols is a starting network energy mode, a final network energy mode, a designated network energy mode configured by the TRP, a base station, or a location server, or a selected network energy mode selected by the UE, of the two or more of the network energy modes.

14. The method of claim 1, wherein:
the UE is configured to transmit multiple groups of SL-PRS symbols of respective SL-PRS resources of a SL-PRS resource set that overlaps two or more of the network energy modes, and
the method further comprises:
transmitting the multiple groups of SL-PRS symbols based on a same SL-PRS transmit power associated with one of the two or more of the network energy modes; or
transmitting each group of the multiple groups of SL-PRS symbols based on corresponding one or more SL-PRS transmit power associated with one or more network energy modes which the corresponding SL-PRS resource overlaps.

15. The method of claim 14, wherein the one of the two or more of the network energy modes for the multiple groups of SL-PRS symbols is a starting network energy mode, a final network energy mode, a designated network energy mode configured by the TRP, a base station, or a location server, or a selected network energy mode selected by the UE, of the two or more of the network energy modes.

16. The method of claim 1, further comprising:
setting the SL-PRS transmit power according to a fixed value or a first equation based on the one of the network energy modes being a network energy saving mode that allocates communication with the TRP within a first portion of a system bandwidth and allocates a SL-PRS resource for the at least one SL-PRS symbol within a second portion of the system bandwidth different from the first portion of the system bandwidth; and
setting the SL-PRS transmit power according to a second equation different from the first equation based on the one of the network energy modes being not the network energy saving mode.

17. The method of claim 1, wherein:
the network energy modes comprise a baseline network energy mode and one or more network energy saving modes, the one or more network energy saving modes corresponding to applying one or more power saving modifications to the baseline network energy mode, and
the communication between the TRP and the UE is set to use the baseline network energy mode for a slot at which a SL-PRS resource for the at least one SL-PRS symbol is allocated.

18. A user equipment (UE), comprising:
a memory;
at least one transceiver; and
at least one processor communicatively coupled to the memory and the at least one transceiver, the at least one processor configured to:
  obtain information indicating one of a plurality of network energy modes for communication between a transmission-reception point (TRP) and the UE; and
  engage in a sidelink positioning session with at least one other UE, wherein the at least one processor is configured to:
    transmit, via the at least one transceiver, at least one sidelink positioning reference signal (SL-PRS) symbol for the sidelink positioning session based on a SL-PRS transmit power associated with the one of the plurality of network energy modes.

19. The UE of claim 18, wherein the at least one processor is further configured to:
  obtain an offset value associated with the one of the network energy modes; and
  set the SL-PRS transmit power based on applying the offset value to a baseline value.

20. The UE of claim 19, wherein the at least one processor is further configured to determine the baseline value based on:
  a pre-defined, fixed value,
  a configured value from the TRP, a base station, or a location server,
  a power class of the UE,
  a regulatory power requirement for a frequency range for the at least one SL-PRS symbol, or
  a combination thereof.

21. The UE of claim 19, wherein the at least one processor is further configured to determine the baseline value based on an Energy per Resource Element (EPRE) of a Sidelink Channel State Information Reference Signal (SL-CSI-RS), a Physical Sidelink Control Channel (PSCCH) Demodulation Reference Signal (DMRS), or a Physical Sidelink Shared Channel (PSSCH) DRMS transmitted by the UE.

22. The UE of claim 19, wherein the at least one processor configured to obtain the offset value associated with the one of the network energy modes is further configured to:
  identify the offset value in a lookup table specifying candidate offset values in association with at least a subset of the network energy modes, or
  receive, via the at least one transceiver, the offset value via signaling from the TRP, a base station, or a location server.

23. The UE of claim 22, wherein the lookup table is:
  prestored in the UE according to a communication standard, or
  configured by the TRP, the base station, or the location server.

24. The UE of claim 22, wherein the offset value is included in:
  a positioning system information block (SIB),
  a medium access control control element (MAC-CE) or downlink control information (DCI) message that also includes the information indicating the one of the network energy modes,
  one or more radio resource control (RRC) messages, or
  one or more Long Term Evolution positioning protocol (LPP) messages from the location server.

25. The UE of claim 18, wherein the at least one processor is further configured to:
  obtain a path-loss value for the UE;
  obtain a path-loss coefficient or a path-loss offset value associated with the one of the network energy modes;
  obtain a reference power calculated based on the path-loss value and based on the path-loss coefficient or the path-loss offset value; and
  set the SL-PRS transmit power based on the reference power.

26. The UE of claim 25, wherein:
the at least one processor configured to obtain the reference power is further configured to calculate the reference power based on an equation of $$P_{REF}=P_t+\alpha_{NES}\times PL,$$

$P_{REF}$ representing the reference power,
  $P_t$ representing a target received power at the at least one other UE,
  $\alpha_{NES}$ representing the path-loss coefficient associated with the one of the network energy modes, and
  PL representing the path-loss value for the UE, and
the at least one processor is configured to set the SL-PRS transmit power based on a smaller one of a maximum permitted transmission power for the UE and the reference power.

27. The UE of claim 25, wherein:
the at least one processor configured to obtain the reference power is further configured to calculate the reference power based on an equation of $$P_{REF}=P_t+\alpha\times PL+GN_{NES},$$

$P_{REF}$ representing the reference power,
  $P_t$ representing a target received power at the at least one other UE,
  $\alpha$ representing a path-loss coefficient that is not associated with the one of the network energy modes,
  PL representing the path-loss value for the UE, and
  $GN_{NES}$ representing the path-loss offset value associated with the one of the network energy modes, and
the at least one processor is configured to set the SL-PRS transmit power based on a smaller one of a maximum permitted transmission power for the UE and the reference power.

28. The UE of claim 25, wherein the path-loss coefficient or the path-loss offset value is:
  prestored in the UE according to a communication standard,
  configured by the TRP, a bases station, or a location server,
  included in one or more radio resource control (RRC) messages,
  included in a positioning system information block (SIB),
  included in a medium access control control element (MAC-CE) or downlink control information (DCI) message that also includes the information indicating the one of network energy modes, or
  included in one or more Long Term Evolution positioning protocol (LPP) messages from the location server.

* * * * *